United States Patent
Kozawa et al.

(10) Patent No.: US 6,952,968 B2
(45) Date of Patent: Oct. 11, 2005

(54) DEVICE FOR DETECTING PHYSICAL QUANTITY HAVING A HOUSING WITH A GROOVE

(75) Inventors: Masayuki Kozawa, Hitachinaka (JP); Shinya Igarashi, Naka (JP); Hiromu Kikawa, Hitachinaka (JP); Hiroyuki Abe, Ohmiya (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 22 days.

(21) Appl. No.: 10/468,105
(22) PCT Filed: Feb. 21, 2001
(86) PCT No.: PCT/JP01/01223
§ 371 (c)(1),
(2), (4) Date: Aug. 15, 2003
(87) PCT Pub. No.: WO02/066937
PCT Pub. Date: Aug. 29, 2002

(65) Prior Publication Data
US 2004/0060361 A1 Apr. 1, 2004

(51) Int. Cl.$^7$ ................................................. G01L 7/00
(52) U.S. Cl. ........................................................ 73/756
(58) Field of Search .............. 73/715–728, 861–861.64, 73/756, 706, 116–118.1; 439/188, 350, 488, 489

(56) References Cited

U.S. PATENT DOCUMENTS

| 3,641,826 A | * | 2/1972 | Heckendorf et al. ...... 73/514.01 |
| 5,060,108 A | * | 10/1991 | Baker et al. ............. 361/283.4 |
| 5,066,244 A | * | 11/1991 | Kato et al. ................... 439/489 |
| 5,515,606 A | * | 5/1996 | Albeck et al. ................ 29/850 |
| 5,672,073 A | * | 9/1997 | Matsumura et al. ........ 439/489 |
| 6,012,432 A | | 1/2000 | Igarashi et al. |
| 6,131,467 A | * | 10/2000 | Miyano et al. ............... 73/756 |

FOREIGN PATENT DOCUMENTS

| EP | 821220 | 1/1998 |
| JP | 3-233168 | 10/1971 |
| JP | 11-351932 | 12/1999 |

* cited by examiner

Primary Examiner—William Oen
(74) Attorney, Agent, or Firm—Mattingly, Stanger, Malur, & Brundidge, P.C.

(57) ABSTRACT

A resistance heater 134 for detecting an air flow rate is supported by support members 134A, 134B. A housing 110 contains an electronic circuit 140 connected to the resistance heater 134. The housing 110 is formed by integral molding with a terminal 142 for connecting the electronic circuit 140 to an external device. The terminal 142 is formed integrally with the housing 110. The housing 110 has a groove 112 through which the terminal 142 is exposed in part.

17 Claims, 30 Drawing Sheets

US 6,952,968 B2

DEVICE FOR DETECTING PHYSICAL QUANTITY HAVING A HOUSING WITH A GROOVE

TECHNICAL FIELD

The present invention relates to a device for detecting a physical quantity, which detects a physical quantity such as an air flow rate or a pressure, and more particularly to a device for detecting a physical quantity, which is suitable for detecting, e.g., a flow rate or a pressure of air sucked into an internal combustion engine of an automobile.

BACKGROUND ART

As one conventional device for detecting a physical quantity, as disclosed in, for example, JP,A 3-233168, an air flowmeter with a resistance heater has a structure in which a housing section containing an electronic circuit is formed integrally with an auxiliary air passage section, and the housing section and the auxiliary air passage section are arranged side by side on one plane. The air flowmeter is mounted to a body, in which an intake air passage of an internal combustion engine is formed, such that a flow rate detecting unit disposed in the auxiliary air passage section is located in the intake air passage.

DISCLOSURE OF THE INVENTION

When manufacturing a device for detecting a physical quantity, e.g., an air flowmeter, works for adjusting characteristics of the detecting device, such as sensitivity and 0-span, are required. These adjustment works require the flow rate detecting unit to be subjected to an actual airflow. To enable the adjustment works to start, it is therefore necessary to, after almost completing the auxiliary air passage section including the flow rate detecting unit, mount the auxiliary air passage section to equipment corresponding to the intake air passage and then actually flow air.

Particularly, in an air flowmeter with a resistance heater, because of the necessity that a detector has a very small size and is electrically connected to an electronic circuit for controlling the detector and outputting a signal from it, the electronic circuit to be adjusted must be brought into an adjustable state without inserting it in the intake air passage when an adjustment is carried out while introducing air to flow to the air flow detecting unit. Accordingly, there has been a problem that the adjusting equipment tends to be complex and the manufacturing process is complicated.

For adjusting detection characteristics, an adjusting device is required to be electrically connected to power source, ground and output terminals, which are provided in a usual detecting device, so as to check characteristics of the detecting device. Because those terminals are contained in a housing connector, the connection between the terminals and the adjusting device can be established, for example, by a method of coupling a connector of the adjusting device to a housing connector. However, since the housing connector is formed in various forms, adjusting devices having various connectors in match with the housing connector forms must be prepared and hence the adjustment works become intricate. Generally, the in-connector terminals and a circuit board are connected, for example, by wire bonding in many cases. While it is therefore also conceivable to connect the adjustment terminals of the adjusting device to bonding pads, this method requires the bonding pads to additionally have positions for connection to the adjustment terminals of the adjusting device. If the positions for the adjustment terminals are prepared in the bonding pads on the circuit board having a reduced size, a larger restriction is imposed on a pattern layout. Alternatively, if the positions for the adjustment terminals are prepared in an area on the terminal side which is subjected to the bonding, reliability of the bonding is reduced. Further, since the positions of the bonding pads differ depending on the types of detecting devices, adjusting devices having various type of adjustment terminals must also be prepared and hence the adjustment works become intricate.

An object of the present invention is to provide a device for detecting a physical quantity, which can easily perform adjustment works and can simplify a manufacturing process.

To achieve the above object, the present invention provides a device for detecting a physical quantity, the device comprising a detector for detecting a physical quantity; an electronic circuit electrically connected to the detector; a housing for accommodating and holding the electronic circuit therein; and a terminal for connecting the electronic circuit to an external device and a connector housing for surrounding the terminal projected externally of the housing, the terminal and the connector housing being both disposed in the housing, wherein a groove for making a part of the terminal exposed therein is formed in a part of a frame portion of the housing in which the terminal communicates the electronic circuit on the inner side and the connector housing on the outer side with each other.

Also, the present invention provides a device for detecting a physical quantity, the device comprising a detector for detecting a physical quantity; an electronic circuit electrically connected to the detector and outputting a signal corresponding to the physical quantity; a housing for accommodating and holding the electronic circuit therein; and a support member for supporting the detector externally of the housing, the support member being disposed in the housing, wherein a groove for making a part of the support member exposed therein is formed in a part of a frame portion of the housing in which the support member communicates the electronic circuit on the inner side and the detector on the outer side with each other.

With those constructions, the terminal and the support member each exposed in the groove can be employed as an adjustment terminal for obtaining output characteristics in adjustment works. As a result, the adjustment works can easily be performed and the manufacturing process can be simplified.

BEST MODE FOR CARRYING OUT THE INVENTION

A construction of a device for detecting a physical quantity according to a first embodiment of the present invention will be described below with reference to FIGS. 1 to 24. Note that the following description is made of the device for detecting the physical quantity, taking as an example an air flowmeter with a resistance heater.

To begin with, an overall construction of the air flowmeter as the device for detecting the physical quantity according to this embodiment will be described with reference to FIGS. 1 and 2.

Figure 1:
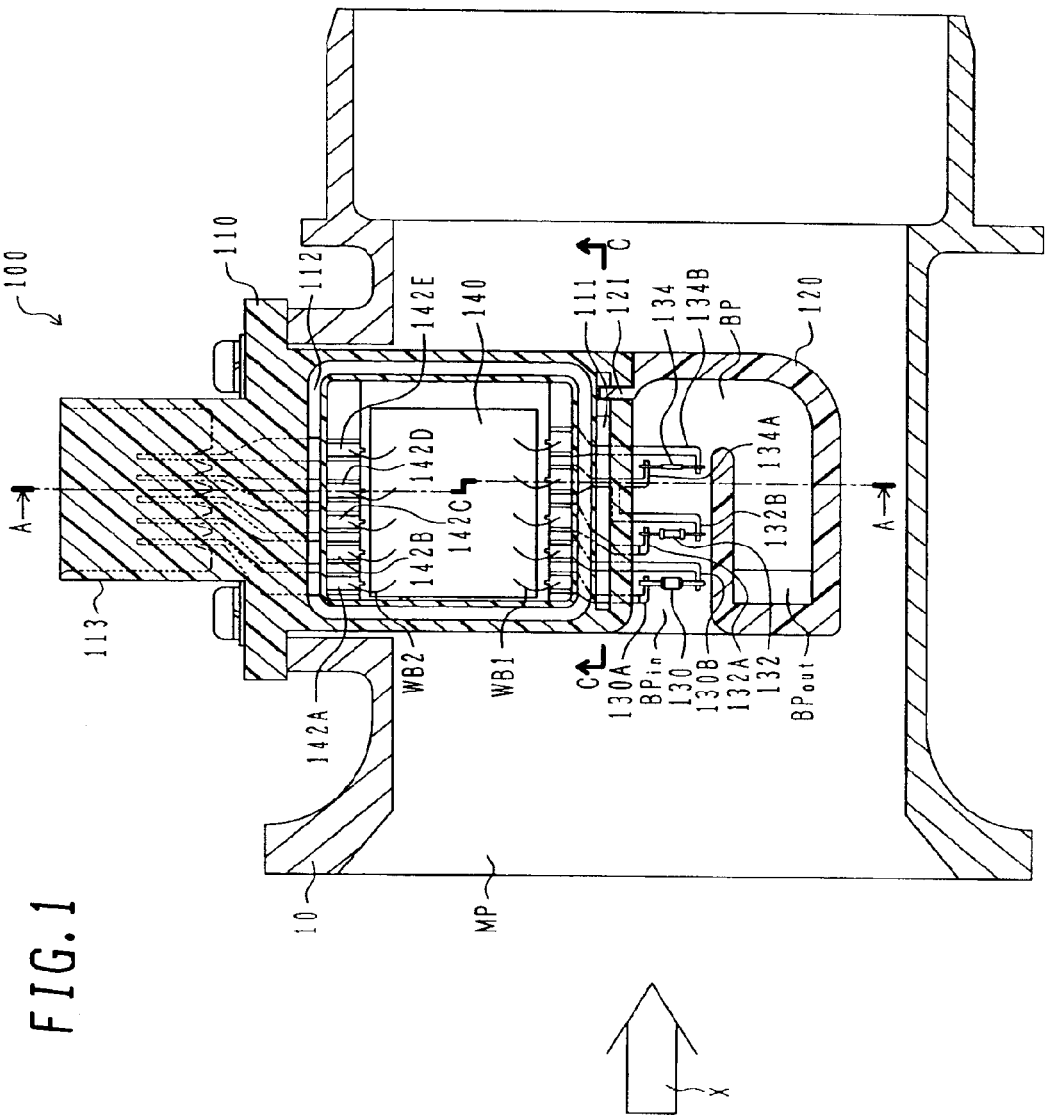
FIG. 1 is a cross-sectional view showing an overall construction of an air flowmeter as a device for detecting a physical quantity according to a first embodiment of the present invention.
Figure 2:
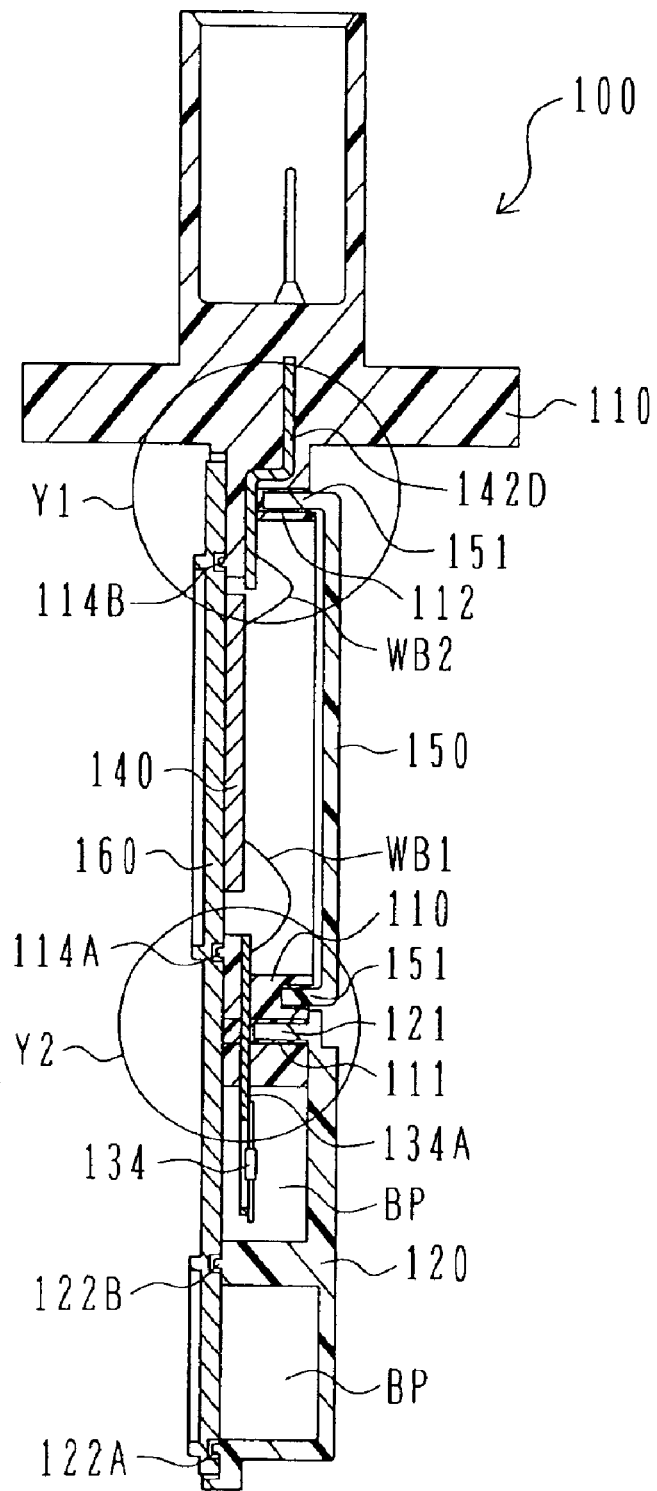
FIG. 2 is an enlarged sectional view taken along the line A—A in FIG. 1.

FIG. 1 is a cross-sectional view showing an overall construction of an air flowmeter as a device for detecting a physical quantity according to a first embodiment of the present invention, and FIG. 2 is an enlarged sectional view taken along the line A—A in FIG. 1. Note that, in FIGS. 1 and 2, the same characters denote the same components.

As shown in FIG. 1, an air flowmeter 100 is mounted to a main passage body 10. A main air passage MP is formed in the main passage body 10, and intake air for an internal combustion engine is introduced in the direction of an arrow X, for example. A fore end of the air flowmeter 100 is inserted to project into the main air passage MP.

The air flowmeter 100 comprises a housing 110 and an auxiliary passage body 120. The housing 110 and the auxiliary passage body 120 are each formed as a molded member made of an insulating material. A projection 121 of the auxiliary passage body 120 is fitted to a groove 111 formed in the housing 110, and the auxiliary passage body 120 is fixed to the housing 110 by using an adhesive. The groove 111 is formed as a slot penetrating through the housing 110. An auxiliary air passage BP is formed in the auxiliary passage body 120. A part of the intake air flowing through the main air passage MP flows into the auxiliary air passage BP from an inlet port BPin and flows out of if from an outlet port BPout.

An intake-air temperature sensor 130, a resistance heater 134, and a temperature sensitive resistor 132 are disposed in the auxiliary air passage BP. The intake-air temperature sensor 130 is used to detect a temperature of intake air. The temperature sensitive resistor 132 is used to detect a temperature of intake air and to compensate an amount of intake air measured by the resistance heater 134. The resistance heater 134 is used to detect an air flow rate. In the auxiliary air passage BP, the intake-air temperature sensor 130, the temperature sensitive resistor 132, and the resistance heater 134 are arranged in this order from the upstream side. The order in arrangement of those components may be changed to any other suitable order. Additionally, the intake-air temperature sensor 130 is not always essential.

Opposite ends of the intake-air temperature sensor 130, the temperature sensitive resistor 132, and the resistance heater 134 are connected to and fixedly supported by one ends of conductive support members 130A, 130B, 132A, 132B, 134A and 134B. The conductive support members 130A, 130B, 132A, 132B, 134A and 134B are fixedly supported to the housing 110 by insert molding. In the state in which the auxiliary passage body 120 is not mounted to the housing 110, all the conductive support members 130A, 130B, 132A, 132B, 134A and 134B are each exposed in the flat form in an area corresponding to the groove 111. Note that the exposed part is not necessarily limited to the flat form. When mounting the auxiliary passage body 120, the parts of the conductive members exposed in the groove 111 are covered with an adhesive. Because of the conductive members 130, 132, and 134 each being exposed in the flat form in the groove 111, the conductive members will not interfere with application of an adhesive when a product is assembled. Also, because of the groove 111 being linearly extended, a resulting structure allows the adhesive to be applied with ease. Hence, automation of the assembly works can be promoted and the assembly efficiency can be improved. Further, when forming the housing as an insert-molded component in which the conductive members are inserted, moldability of the housing can be improved because it is possible to support intermediate portions of the inserted conductive members.

An electronic circuit 140 is disposed inside a frame-shaped portion of the housing 110. The electronic circuit 140 includes therein a circuit for detecting an air flow rate, a circuit for compensating the detected air flow rate in accordance with an intake air temperature, a sensitivity compensating circuit for compensating sensitivity, and an adjustment circuit for adjusting the 0-span. A plurality of connecting terminals of the electronic circuit 140 are connected respectively to the other ends of the conductive support members 130A, 130B, 132A, 132B, 134A and 134B by wire bonding indicated by WB1. Also, conductive connector terminals 142A, 142B, 142C, 142D and 142E are fixedly supported in an upper portion of the housing 110 by insert molding. One ends of the conductive connector terminals 142A, 142B, 142C, 142D and 142E are connected respectively to a plurality of output terminals of the electronic circuit 140 by wire bonding indicated by WB2. The other ends of the conductive connector terminals 142A, 142B, 142C, 142D and 142E are projected to be exposed inside a housing connector 113 which is formed integrally with the housing 110. By connecting an external connector to the housing connector 113, the detected air flow rate can be taken out to the outside.

One example of the conductive connector terminals will now be described. By way of example, the conductive connector terminal 142A is a positive terminal of the intake-air temperature sensor, the connector terminal 142B is a negative terminal of the intake-air temperature sensor, the connector terminal 142C is a characteristic output terminal, the connector terminal 142D is a ground terminal, and the connector terminal 142E is a power supply terminal. Among those connector terminals, the connector terminals 142C, 142D and 142E are ones that are not specially provided, but are always provided in the ordinary detecting device. Also, the connector terminals 142A, 142B are ones used for the intake-air temperature sensor, and hence are not always essential. In other words, the conductive connector terminals described herein are ones that are necessarily provided in the ordinary detecting device. It is a matter of course that the above-described terminal arrangement may be changed to any other suitable order.

A groove 112 is formed in the housing 110. In the state in which a cover, described later with reference to FIG. 2, is not attached to the housing 110, the conductive connector terminals 142A, 142B, 142C, 142D and 142E are each partly exposed in the flat form in an area corresponding to the groove 112. Note that the exposed part is not necessarily limited to the flat form. The parts of the conductive connector terminals exposed in the groove 112 are covered with an adhesive when the cover is attached in place.

As shown in FIG. 2, a cover 150 is fixedly attached to one surface of the housing 110. The cover 150 has an edge portion 151 bent along its outer periphery. The edge portion 151 is inserted in the groove 112, having a rectangular ring shape, of the housing 110, and the cover 150 is fixed to the housing 110 by an adhesive.

Further, a metal-made base 160 is fixedly mounted to both the other surface of the housing 110 and an open side surface of the auxiliary passage body 120. The base 160 is properly positioned by pressing projections 122A, 122B provided on the auxiliary passage body 120 and projections 114A, 114B provided on the housing 110 into corresponding recesses formed in the base. Thereafter, the base 160 is fixedly mounted in place using an adhesive. A manner of realizing the combined structure is not always limited to pressing, but may be, for example, fitting. The electronic circuit 140 is mounted to the base 160 such that the electronic circuit 140 is accommodated in the frame-shaped portion of the housing 110. Since the base 160 is made of a metal having good thermal conductivity, heat generated from the electronic circuit 140 is dissipated to the airflow passing through the main air passage MP for cooling the electronic circuit 140. Additionally, the metal-made base 160 is also able to shield the electronic circuit 140.

Next, a detailed structure of an area Y1 in FIG. 2 will be described with reference to FIGS. 3 and 4.

Figure 3:
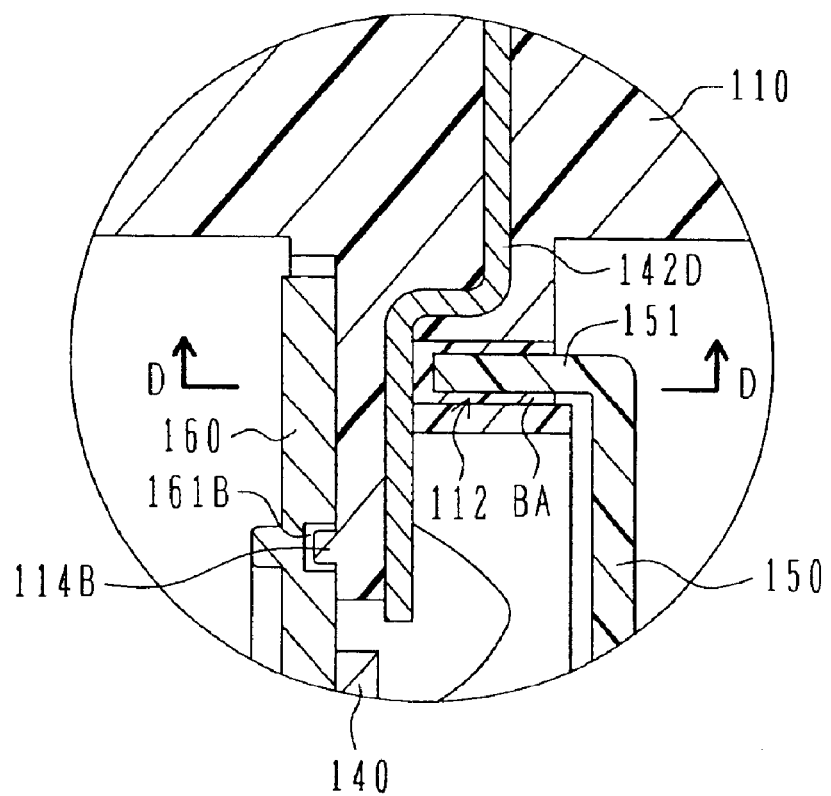
FIG. 3 is a sectional view showing a construction of a principal part of the air flowmeter as the device for detecting the physical quantity according to the first embodiment of the present invention, the view being an enlarged sectional view of an area Y1 in FIG. 2.

FIG. 3 is a sectional view showing a construction of a principal part of the air flowmeter as the device for detecting the physical quantity according to the first embodiment of the present invention, the view being an enlarged sectional view of an area Y1 in FIG. 2. FIG. 4 is a sectional view showing one construction of a principal part of the air flowmeter as the device for detecting the physical quantity according to the first embodiment of the present invention, the view being a sectional view taken along the line D—D in FIG. 3. Note that the same characters as those in FIGS. 1 and 2 denote the same components.

The groove 112 is formed in the housing 110. The groove 112 is provided in a part of the frame-shaped portion of the housing 110 formed to surround the electronic circuit 140. More specifically, in the structure of this embodiment, the groove 112 is defined as a groove in which the cover 150 covering the open side surface of the housing 110 is bonded to the housing 110. In the state in which the cover 150 is not attached to the housing 110, the conductive connector terminal 142D is partly exposed in the flat form in the area corresponding to the groove 112. The edge portion 151 at the outer periphery of the cover 150 is inserted in the rectangular ring-shaped groove 112 of the housing 110, and the cover 150 is fixed to the housing 110 by an adhesive BA. The part of the conductive connector terminal 142D exposed in the groove 112 is covered with the adhesive BA when the cover 150 is attached in place. Further, in the structure of this embodiment, the groove 112 has a bottom-equipped channel structure so that the connector terminals 142A, . . . , 142E of the conductive members are exposed in the flat form to lie on a straight line. With such a structure, therefore, stagnant air does not generate in the adhesive BA when the parts of the connector terminals exposed in the groove 112 are covered with the adhesive BA.

The projection 114B provided on the housing 110 is pressed into a recess 161B formed in the base 160, whereby base 160 is properly positioned. Thereafter, the base 160 is fixedly mounted in place using an adhesive. A manner of realizing the combined structure is not always limited to pressing, but may be, for example, fitting.

Another example of the detailed structure of the area Y1 in FIG. 2 will now be described with reference to FIG. 5.

Figure 4:
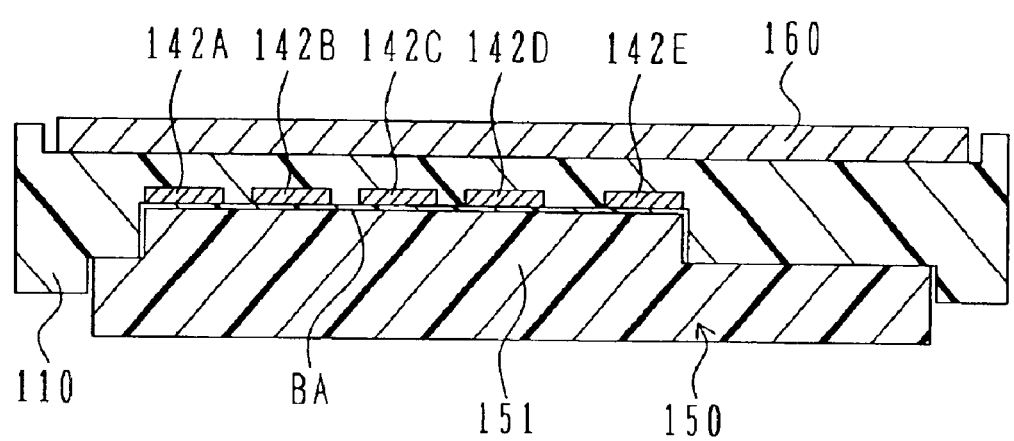
FIG. 4 is a sectional view showing one construction of a principal part of the air flowmeter as the device for detecting the physical quantity according to the first embodiment of the present invention, the view being a sectional view taken along the line D—D in FIG. 3.
Figure 5:
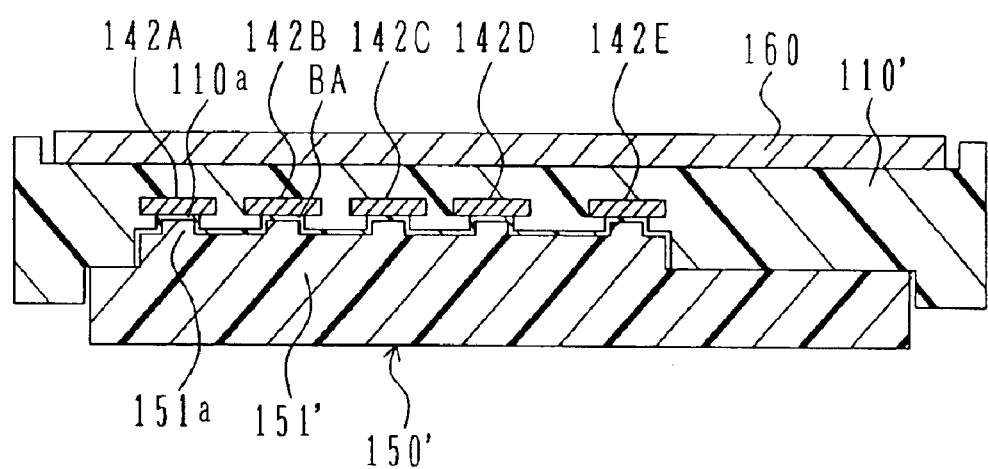
FIG. 5 is a sectional view showing another construction of the principal part of the air flowmeter as the device for detecting the physical quantity according to the firsts embodiment of the present invention, the view being a sectional view taken along the line D—D in FIG. 3.

FIG. 5 is a sectional view showing another construction of the principal part of the air flowmeter as the device for detecting the physical quantity according to the first embodiment of the present invention, the view being a sectional view taken along the line D—D in FIG. 3 similarly to FIG. 4. Note that the same characters as those in FIGS. 1 and 2 denote the same components.

As is apparent from comparison with FIG. 4, one flat surface of the conductive connector terminal 142A is not completely exposed, and a recess 110a is formed in a housing 110'. On the other hand, a projection 151a is provided at a fore end of an edge portion 151' of a cover 150' in a position corresponding to the recess 110a. When attaching the cover 150' to the housing 110', the projection 151a is fitted to the recess 110a.

Next, a detailed structure of an area Y2 in FIG. 2 will be described with reference to FIGS. 6 and 7.

Figure 6:
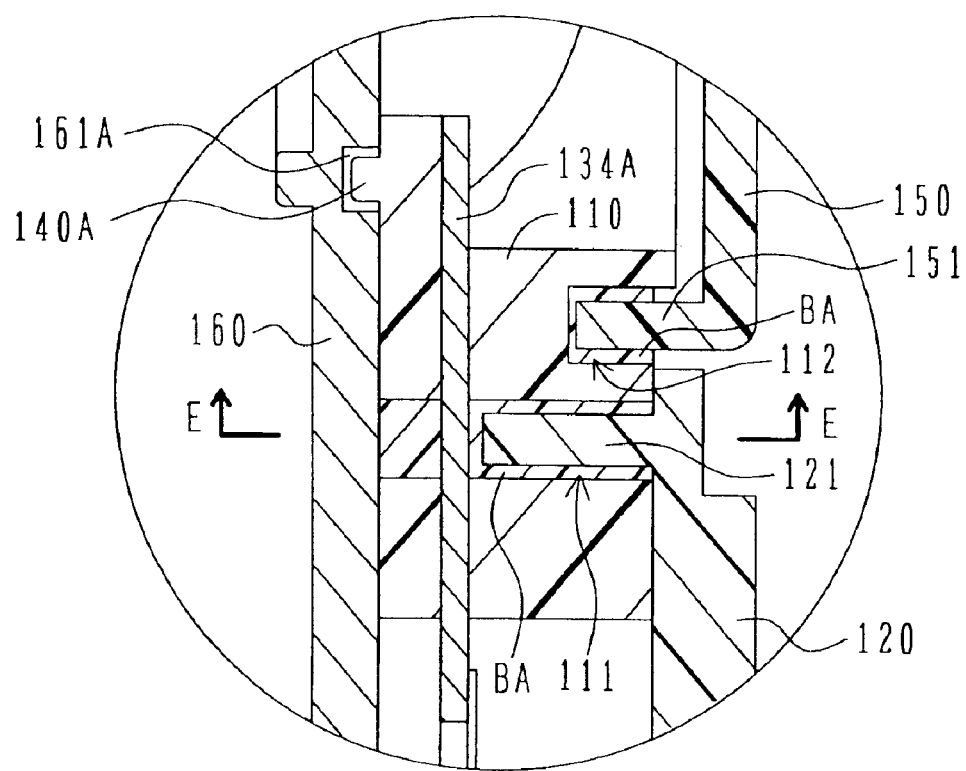
FIG. 6 is a sectional view showing a construction of a principal part of the air flowmeter as the device for detecting the physical quantity according to the first embodiment of the present invention, the view being an enlarged sectional view of an area Y2 in FIG. 2.

FIG. 6 is a sectional view showing a construction of a principal part of the air flowmeter as the device for detecting the physical quantity according to the first embodiment of the present invention, the view being an enlarged sectional view of an area Y2 in FIG. 2. FIG. 7 is a sectional view showing one construction of a principal part of the air flowmeter as the device for detecting the physical quantity according to the first embodiment of the present invention, the view being a sectional view taken along the line E—E in FIG. 6. Note that the same characters as those in FIGS. 1 and 2 denote the same components.

The groove 111 is formed in the housing 110 so as to penetrate it. The groove 111 is provided in a part of the frame-shaped portion of the housing 110 formed to surround the electronic circuit 140. More specifically, in the structure of this embodiment, the groove .111 is defined as a slot in which the auxiliary passage body 120 covering the open side surface of the housing 110 is bonded to the housing 110. In the state in which the auxiliary passage body 120 is not attached to the housing 110, the conductive support member 134A is entirely exposed in the flat form in the area corresponding to the groove 111. The projection 121 at the outer periphery of the auxiliary passage body 120 is inserted in the groove 111 of the housing 110, and the auxiliary passage body 120 is fixed to the housing 110 by an adhesive BA. The part of the conductive member 134A exposed in the groove 111 is covered with the adhesive BA when the auxiliary passage body 120 is mounted to the housing 110.

A projection 140A provided on the housing 110 is pressed into a recess 161A formed in the base 160, whereby the base 160 is properly positioned. Thereafter, the base 160 is fixedly mounted in place using an adhesive. A manner of realizing the combined structure is not always limited to pressing, but may be, for example, fitting.

Another example of the detailed structure of the area Y2 in FIG. 2 will now be described with reference to FIG. 8.

Figure 7:
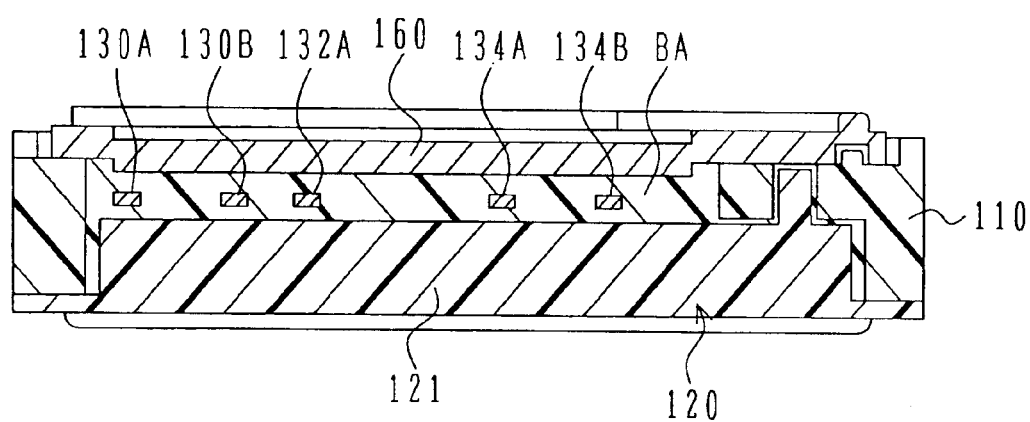
FIG. 7 is a sectional view showing one construction of a principal part of the air flowmeter as the device for detecting the physical quantity according to the first embodiment of the present invention, the view being a sectional view taken along the line E—E in FIG. 6.
Figure 8:
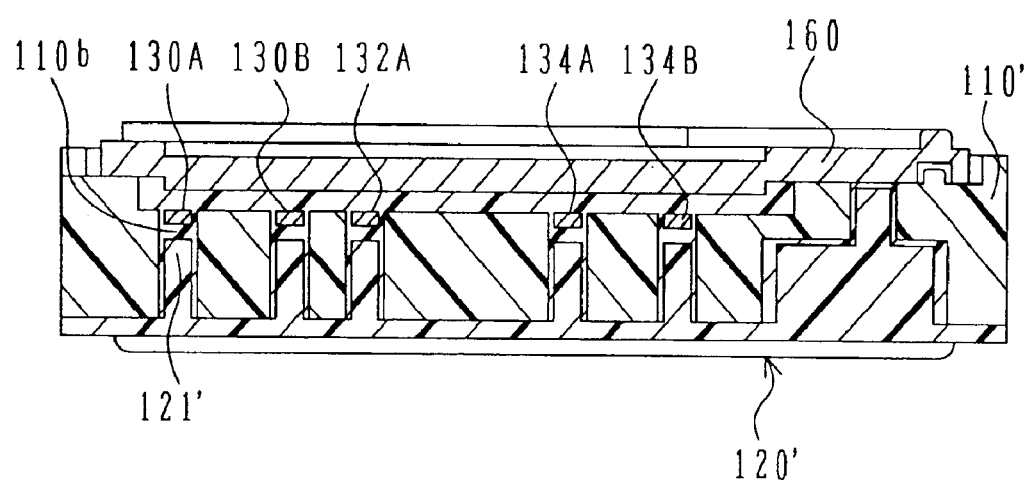
FIG. 8 is a sectional view showing another construction of the principal part of the air flowmeter as the device for detecting the physical quantity according to the first embodiment of the present invention, the view being a sectional view taken along the line E—E in FIG. 6.

FIG. 8 is a sectional view showing another construction of the principal part of the air flowmeter as the device for detecting the physical quantity according to the first embodiment of the present invention, the view being a sectional view taken along the line E—E in FIG. 6 similarly to FIG. 7. Note that the same characters as those in FIGS. 1 and 2 denote the same components.

As is apparent from comparison with FIG. 7, the conductive support member 134A is placed in a slit-like groove 110b formed in a housing 110'. On the other hand, a projection 121' is provided on an auxiliary passage body 120' in the form of one of comb teeth-like projections. When attaching the auxiliary passage body 120' to the housing 110' the projection 121' is fitted to the groove 110b.

Next, a method of adjusting characteristics of the air flowmeter as the device for detecting the physical quantity according to this embodiment will be described with reference to FIGS. 9 to 12.

Figure 9:
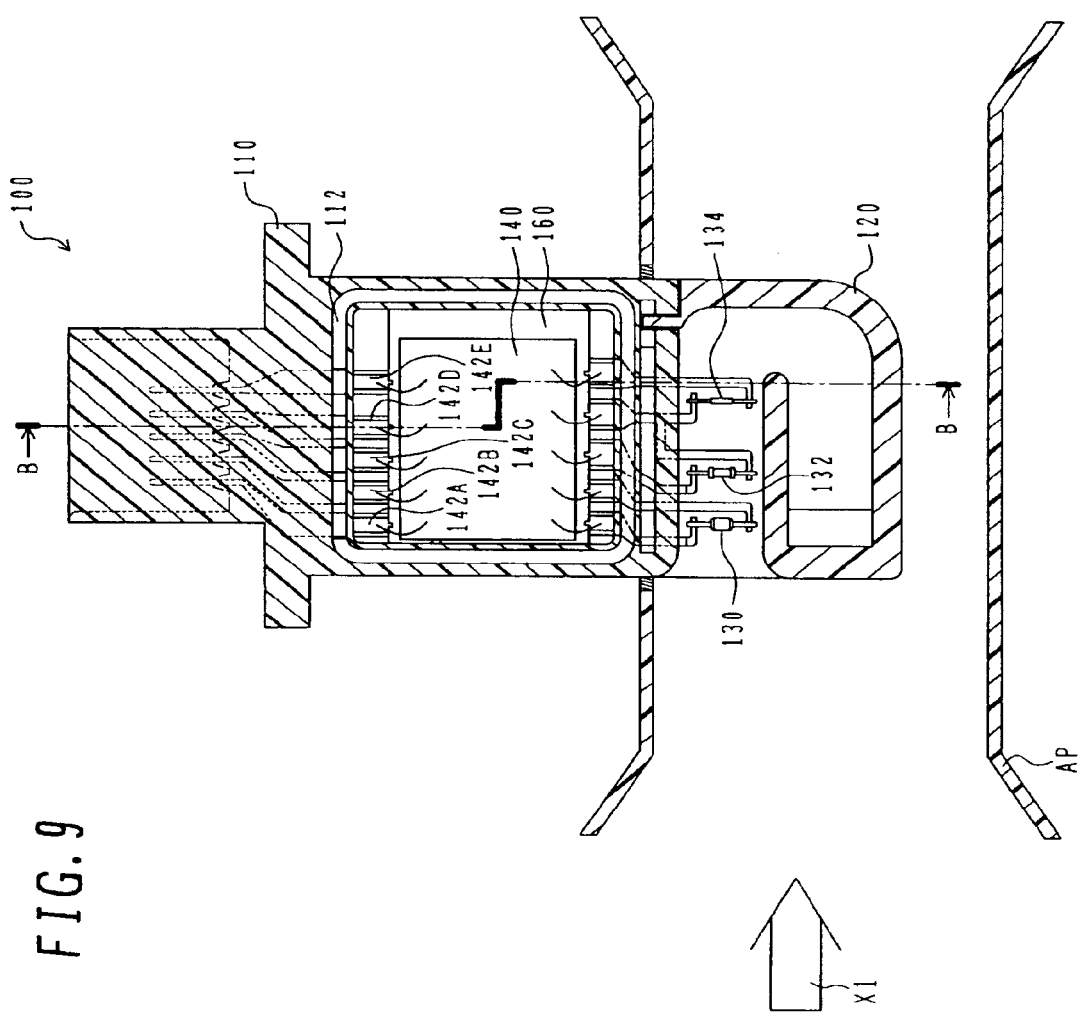
FIG. 9 is a cross-sectional view for explaining a mounted state in adjustment of characteristics of the air flowmeter as the device for detecting physical quantity according to the first embodiment of the present invention.
Figure 10:
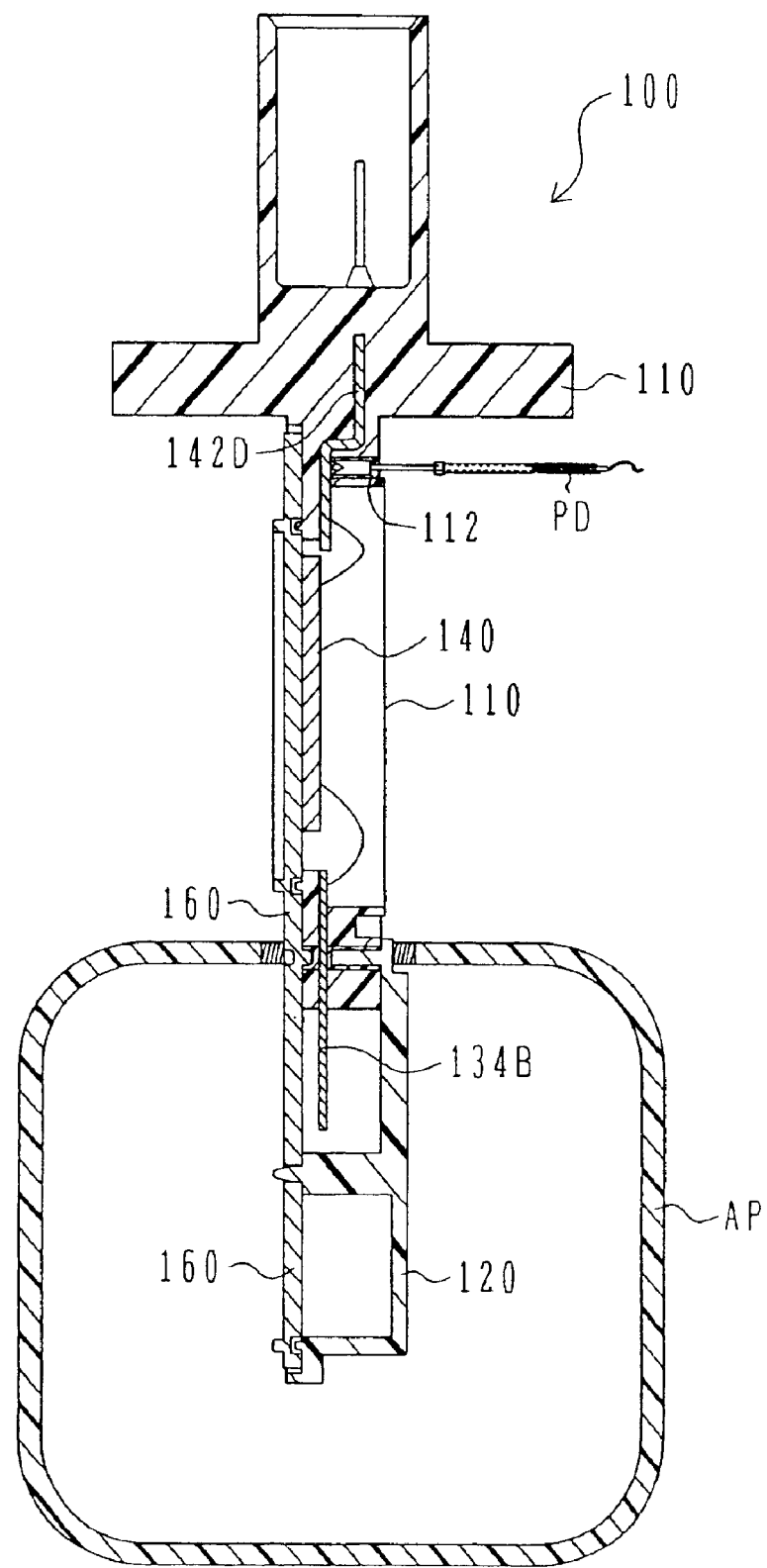
FIG. 10 is a sectional view taken along the line B—B in FIG. 9, looking in the direction of arrow.

A description is first made of a mounted state of the air flowmeter according to this embodiment in adjustment of characteristics of the air flowmeter with reference to FIGS. 9 and 10.

FIGS. 9 and 10 are each an explanatory view for explaining a mounted state in adjustment of characteristics of the air flowmeter as the device for detecting physical quantity according to the first embodiment of the present invention. FIG. 9 is a cross-sectional view and FIG. 10 is a sectional view taken along the line B—B in FIG. 9, looking in the direction of arrow. Note that the same characters as those in FIGS. 1 and 2 denote the same components.

As shown in FIG. 9, the air flowmeter 100 comprises the housing 110, the auxiliary passage body 120, the resistance heater 134, the temperature sensitive resistor 132, the intake-air temperature sensor 130, the electronic circuit 140, and the base 160. When performing the adjustment of characteristics, the cover 150 shown in FIG. 2 is not attached to the housing 110. Therefore, the conductive connector terminals 142A, . . . , 142E are partly exposed in the flat form in the areas corresponding to the groove 112 of the housing 110. Also, at this point of time, the exposed parts of the conductive connector terminals are not covered with the adhesive BA.

The auxiliary passage body 120 of the air flowmeter 100, which is in the state of the cover 150 being not attached, is inserted in a characteristic adjustment passage AP. The electronic circuit 140 and the connector terminals 142A, . . . , 142E are projected externally of the characteristic adjustment passage AP. An airflow for characteristic adjustment flows through the characteristic adjustment passage AP as indicated by an arrow X1.

Subsequently, as shown in FIG. 10, a fore end of a characteristic adjustment probe PD is brought into contact with the part of the conductive connector terminal 142D, which is exposed in the flat form in the area corresponding to the groove 112 of the housing 110, for electrical connection between the conductive connector terminal 142D and the characteristic adjustment probe PD.

Figure 11:
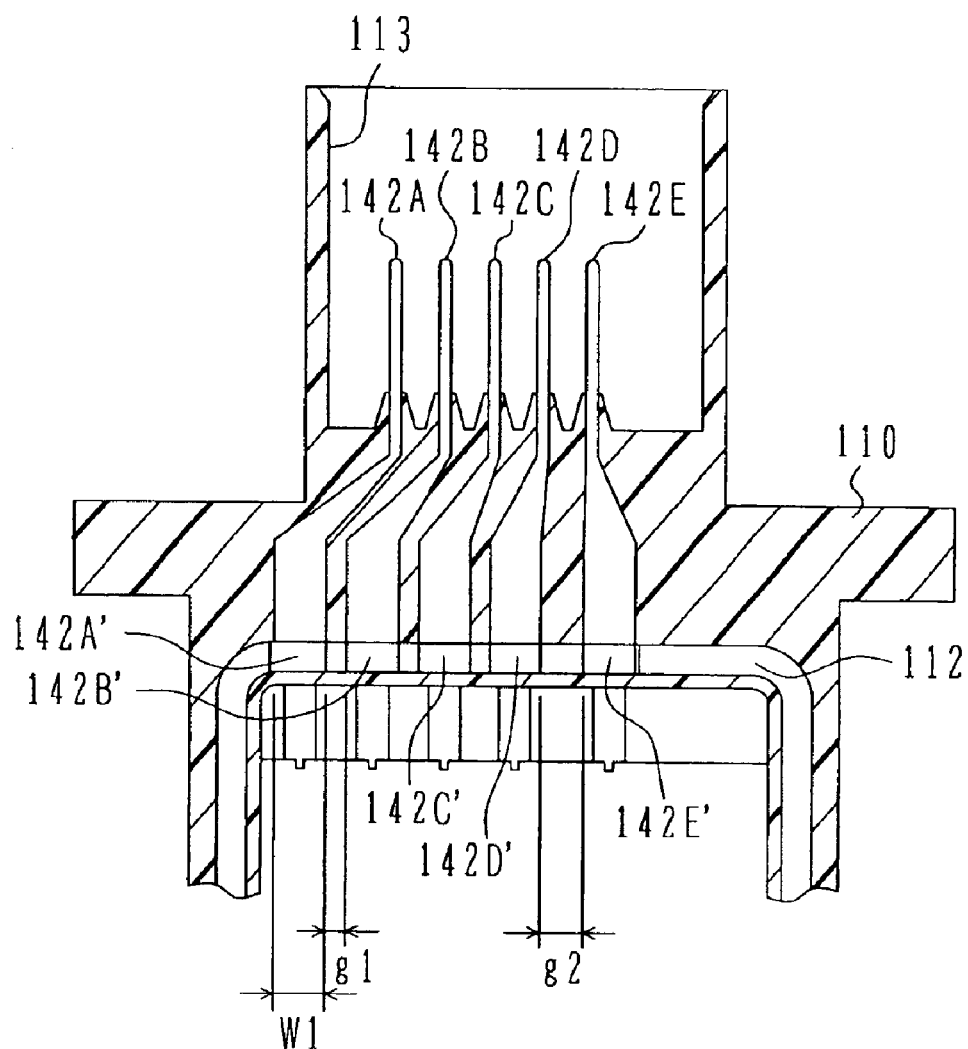
FIG. 11 is a partial sectional view showing a construction of a contact section of a probe used for adjustment of characteristics of an air flowmeter according to one embodiment of the present invention.

Next, a description is made of a construction of a contact section of a probe used for adjustment of characteristics of the air flowmeter according to this embodiment with reference to FIG. 11.

FIG. 11 is a partial sectional view showing a construction of a contact section of a probe used for adjustment of characteristics of an air flowmeter according to one embodiment of the present invention. Note that the same characters as those in FIGS. 1 and 2 denote the same components.

The conductive connector terminals 142A, 142B, 142C, 142D and 142E are fixedly supported in the housing 110 by insert molding. Since the groove 112 is formed in the housing 110, respective parts 142A', 142B', 142C', 142D' and 142E' of the conductive connector terminals 142A, 142B, 142C, 142D and 142E are exposed in the flat form in the areas corresponding to the groove 112 in the state in which the cover is not attached to the housing 110. The exposed parts 142A', 142B', 142C', 142D' and 142E' of the connector terminals 142A, 142B, 142C, 142D and 142E each have a width w1 of, e.g., 2.7 mm. The width w1 can be optionally selected from the range of, e.g., 0.5 to 3 mm. Gaps g1, g2 between relevant adjacent two of the exposed parts 142A', 142B', 142C', 142D' and 142E' of the conductive connector terminals 142A, 142B, 142C, 142D and 142E are respectively 1 mm and 2 mm, for example.

One ends of the conductive connector terminals 142A, 142B, 142C, 142D and 142E are projected to be exposed inside the housing connector 113 which is formed integrally with the housing 110. The shape and dimensions of the housing connector 113 vary depending on customer's demands. However, since the width w1 of and the gaps g1, g2 between the exposed parts 142A', 142B', 142C', 142D' and 142E' of the connector terminals 142A, 142B, 142C, 142D and 142E are not included in customer's specifications, they can be set to have any desired shapes and dimensions. In this embodiment, therefore, the groove 112 is formed in a part of the housing 110 and the shapes and dimensions of the exposed parts 142A', 142B', 142C', 142D' and 142E' of the connector terminals 142A, 142B, 142C, 142D and 142E, which are exposed in the groove, are standardized regardless of the customer's specifications. Accordingly, the dimensions and shapes of probes PD shown in FIG. 10 can be prepared in accordance with unified standards.

Figure 12:
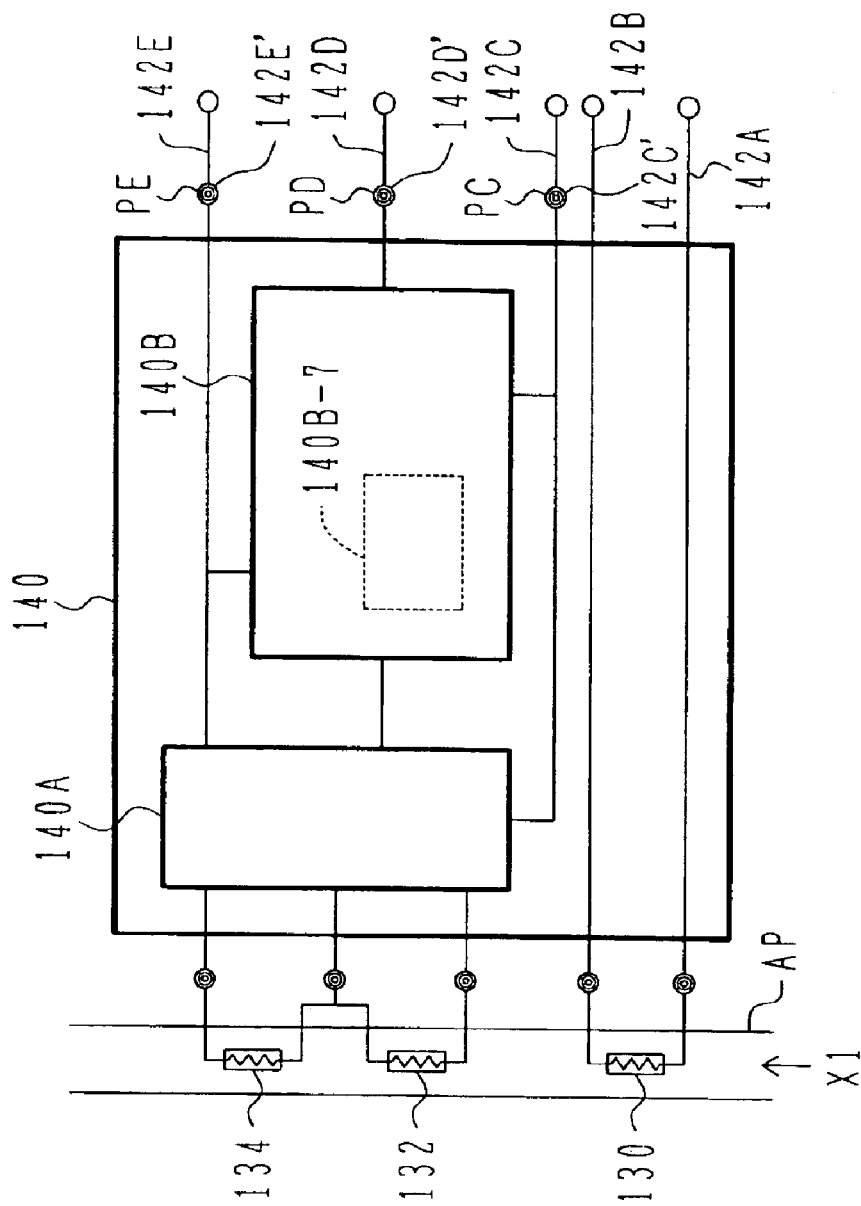
FIG. 12 is a circuit diagram for use in works for adjusting characteristics of the air flowmeter according to the one embodiment of the present invention.

Next, works for adjusting characteristics of the air flowmeter according to this embodiment with reference to FIG. 12.

FIG. 12 is a circuit diagram for use in works for adjusting characteristics of the air flowmeter according to the one embodiment of the present invention. Note that the same characters as those in FIGS. 1 and 2 denote the same components.

The electronic circuit 140 comprises a bridge circuit 140A and an amplification circuit 140B. The resistance heater 134 and the temperature sensitive resistor 132 are both connected to the bridge circuit 140A. A signal corresponding to the air flow rate detected by the bridge circuit 140A is amplified by the amplification circuit 140B. A characteristic adjusting section 140B-T is included in the amplification circuit 140B. The characteristic adjusting section 140B-T is able to adjust the sensitivity and 0-span of the air flow rate signal outputted from the amplification circuit 140B by trimming resistance, etc.

Probes PC, PD and PE are connected respectively to the exposed parts 142C', 142D' and 142E' of the connector terminals 142C, 142D and 142E. The probes PC, PD and PE are also connected to a characteristic adjusting device. During the adjustment of characteristics, probe output signals are read while varying the flow rate of air flowing through the characteristic adjustment passage AP. Then, the adjustment of characteristics is performed by trimming resistance, etc. in the characteristic adjusting section 140B-T so that the sensitivity and 0-span of the air flow rate signal are each held in a preset range. As a result, the adjustment works can easily be performed and the manufacturing process can be simplified with this embodiment.

When mounting the auxiliary passage body 120, the parts of the conductive support members 130A, 130B, 132A, 132B, 134A and 134B exposed in the groove 111 are totally covered with an adhesive. Hitherto, there has been a problem that gas and liquids enter and flow out through small gaps between the molded resin of the housing and the conductive support members, which electrically connect the flow rate detecting section disposed in the intake pipe and the electronic circuit, thus resulting in shortening of the product life and a reduction of the reliability. With this embodiment, however, because the conductive support members 130A, 130B, 132A, 132B, 134A and 134B are covered with a resin such as an adhesive, it is possible to prevent gas and liquids from entering and flowing out through the small gaps between the support members and the resin, and hence to improve the reliability.

Figure 13:
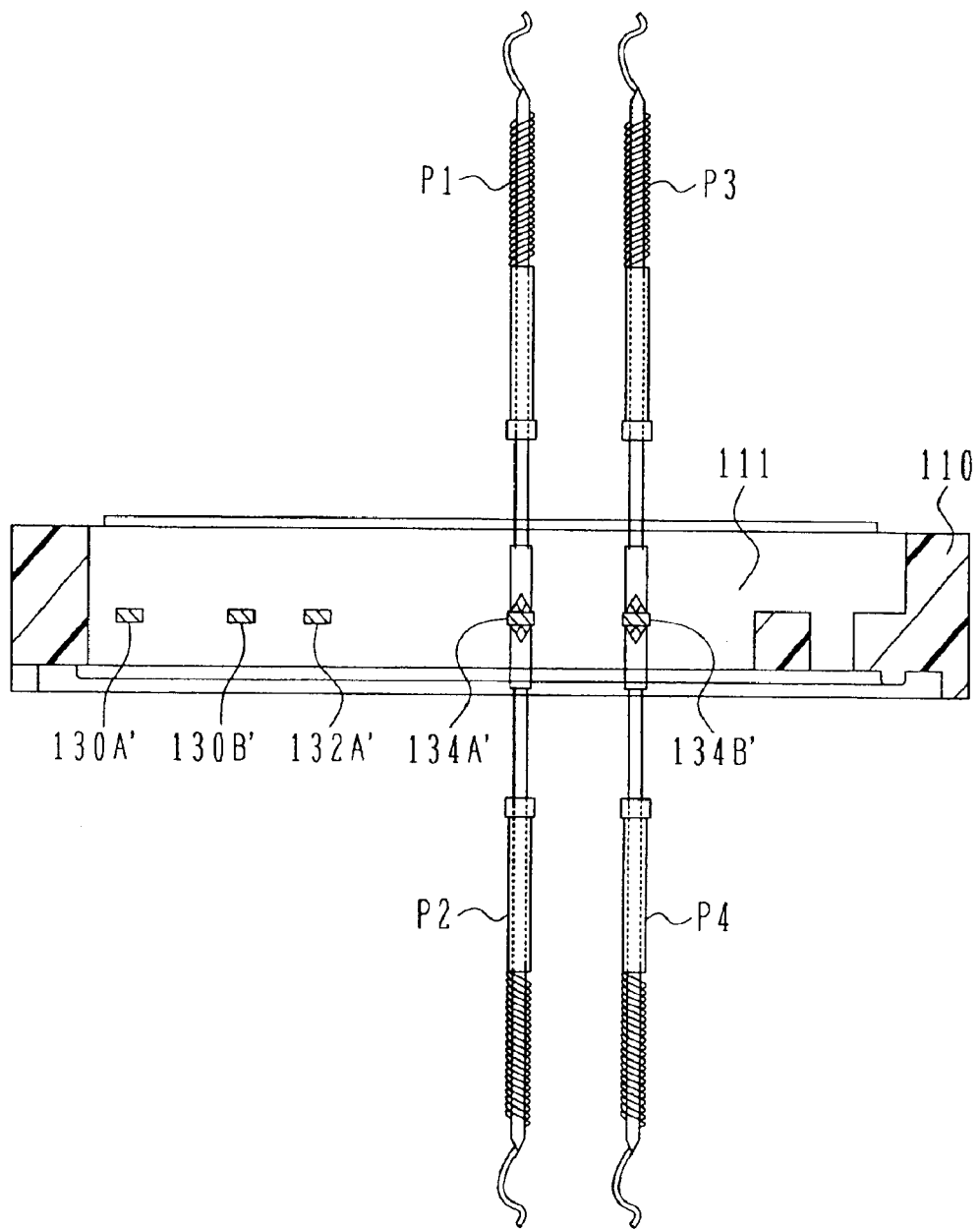
FIG. 13 is an explanatory view for explaining works for measuring resistance of a resistor used in the air flowmeter according to the one embodiment of the present invention.

Next, a description is made of works for measuring resistance of a resistor used in the air flowmeter according to this embodiment with reference to FIG. 13.

FIG. 13 is an explanatory view for explaining works for measuring resistance of a resistor used in the air flowmeter according to the one embodiment of the present invention. FIG. 13 is a sectional view taken along the line C—C in FIG.

1. Note that the same characters as those in FIGS. 1 and 2 denote the same components.

Respective both ends of the intake-air temperature sensor 130, the temperature sensitive resistor 132, and the resistance heater 134 are connected to the one ends of the conductive support members 130A, 130B, 132A, 132B, 134A and 134B and fixedly supported by them. The conductive support members 130A, 130B, 132A, 132B, 134A and 134B are fixedly held in the housing 110 by insert molding. When the auxiliary passage body 120 is not attached to the housing 110, parts 130A', 130B', 132A', 134A' and 134B' of all the conductive support members 130A, 130B, 132A, 132B, 134A and 134B are exposed in the flat form in the areas corresponding to the groove 111. It is here to be noted that the support members 132B and 134A are connected in common to the exposed part 134A'. Further, the conductive support members 130A', 130B', 132A', 134A' and 134B' exposed in the groove 111 have a plate-like sectional shape, and their opposite surfaces parallel to open surfaces of the groove are exposed in the flat form. The parts of the conductive members exposed in the groove 111 are covered with an adhesive when the auxiliary passage body 120 is mounted in place.

Resistance values of the resistance members, such as the intake-air temperature sensor 130, the temperature sensitive resistor 132, and the resistance heater 134, must be measured in advance. To that end, the resistance values of the resistance members 130, 132 and 134 are measured by a 4-terminal method using probes P1, P2, P3 and P4. In the illustrated example, the resistance value of the resistance heater 134 is measured by contacting the probes P1, P2 with one of the resistance heater 134 and contacting the probes P3, P4 with the other end thereof. Because the groove 111 is formed as a through hole in the housing 110, the probes P1, P2, P3 and P4 can be brought into contact with the exposed parts 134A', 134B' of the support member from both sides. It is thus possible to measure the resistance value with high accuracy by employing the 4-terminal method, and to realize a reduction of the device size.

Next, a detailed structure of a second example of the area Y1 in FIG. 2 will be described with reference to FIGS. 14 and 15.

Figure 14:
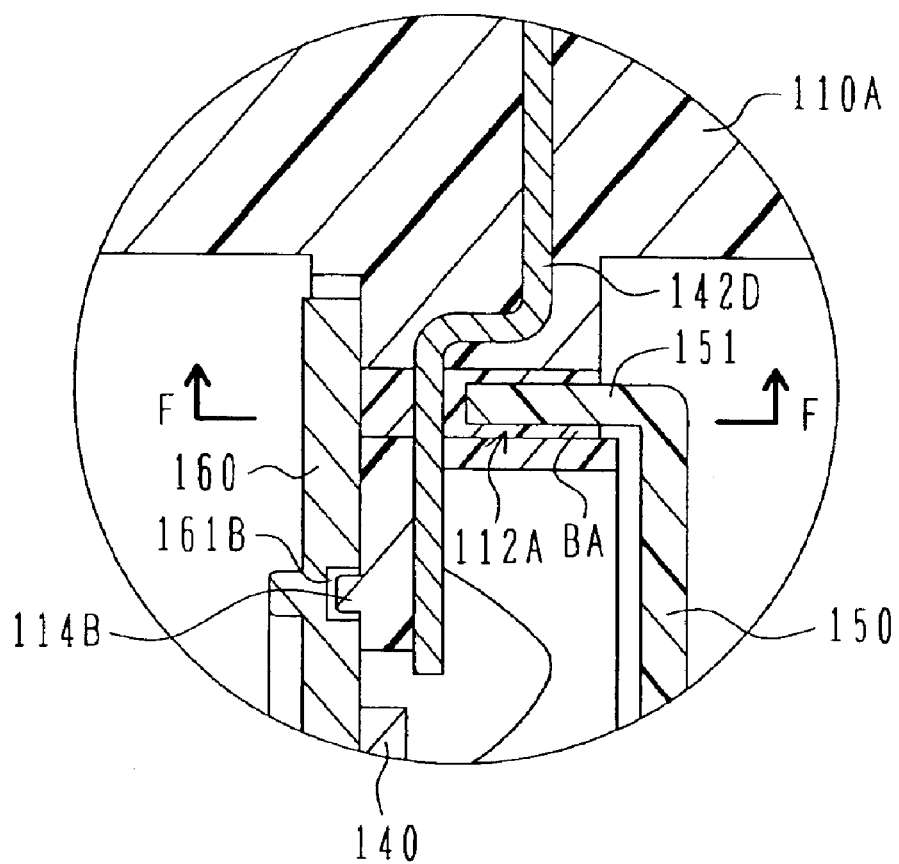
FIG. 14 is a sectional view showing a construction of a second example of the principal part of the air flowmeter as the device for detecting the physical quantity according to the first embodiment of the present invention, the view being an enlarged sectional view corresponding to the area Y1 in FIG. 2.

FIG. 14 is a sectional view showing a construction of a second example of the principal part of the air flowmeter as the device for detecting the physical quantity according to the first embodiment of the present invention, the view being an enlarged sectional view corresponding to the area Y1 in FIG. 2. FIG. 15 is a sectional view showing one construction of the second example of the principal part of the air flowmeter as the device for detecting the physical quantity according to the first embodiment of the present invention, the view being a sectional view taken along the line F—F in FIG. 14. Note that the same characters as those in FIGS. 1, 2 and 3 denote the same components.

A groove 112A is formed in a housing 110A. The groove 112A is in the form of a through hole penetrating the housing 110A. In the state in which the cover 150 is not attached to the housing 110A, the conductive connector terminal 142D is entirely exposed in the flat form in an area corresponding to the groove 112A. An edge portion 151 at an outer periphery of the cover 150 is inserted in the rectangular ring-shaped groove 112A of the housing 110A, and the cover 150 is fixed to the housing 110A by an adhesive BA. The part of the conductive terminal 142D exposed in the groove 112A is covered with the adhesive BA when the cover 150 is attached in place.

A projection 114B provided on the housing 110A is pressed into a recess 161B formed in the base 160, whereby the base 160 is properly positioned. Thereafter, the base 160 is fixedly mounted in place using an adhesive. A manner of realizing the combined structure is not always limited to pressing, but may be, for example, fitting.

Another example of the detailed structure of the area Y1 in FIG. 2 will now be described with reference to FIG. 16.

Figure 15:
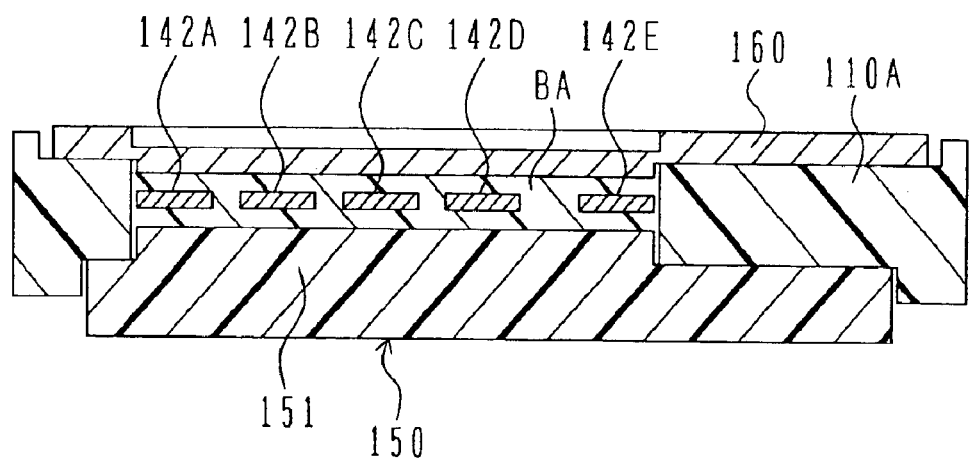
FIG. 15 is a sectional view showing one construction of the second example of the principal part of the air flowmeter as the device for detecting the physical quantity according to the first embodiment of the present invention, the view being a sectional view taken along the line F—F in FIG. 14.
Figure 16:
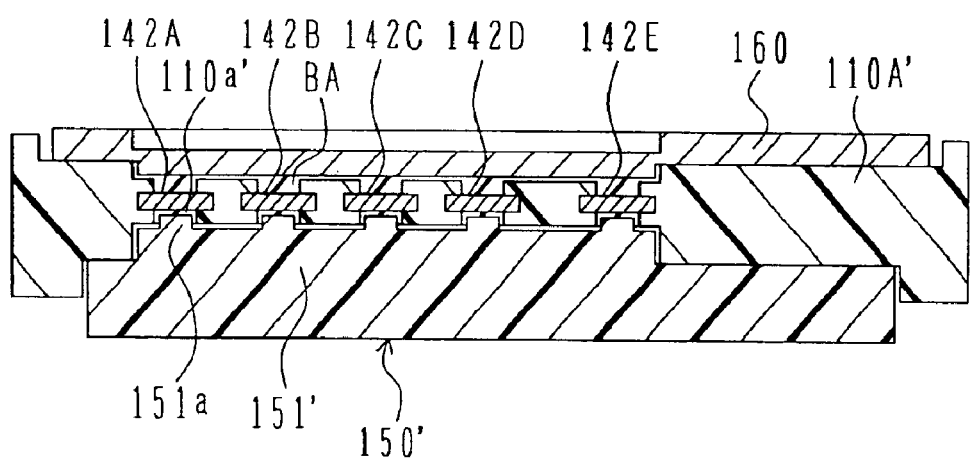
FIG. 16 is a sectional view showing another construction of the principal part of the air flowmeter as the device for detecting the physical quantity according to the first embodiment of the present invention, the view being a sectional view taken along the line F—F in FIG. 14.

FIG. 16 is a sectional view showing another construction of the principal part of the air flowmeter as the device for detecting the physical quantity according to the first embodiment of the present invention, the view being a sectional view taken along the line F—F in FIG. 14 similarly to FIG. 15. Note that the same characters as those in FIGS. 1 and 2 denote the same components.

As is apparent from comparison with FIG. 15, one flat surface of the conductive connector terminal 142A is not completely exposed, and a slot 110a' is formed in a housing 110A'. On the other hand, a projection 151a is provided at a fore end of an edge portion 151' of a cover 150' in a position corresponding to the slot 110a'. When attaching the cover 150' to the housing 110A', the projection 151a is pressed into the slot 110a'.

Next, a detailed structure of a third example of the area Y1 in FIG. 2 will be described with reference to FIG. 17.

Figure 17:
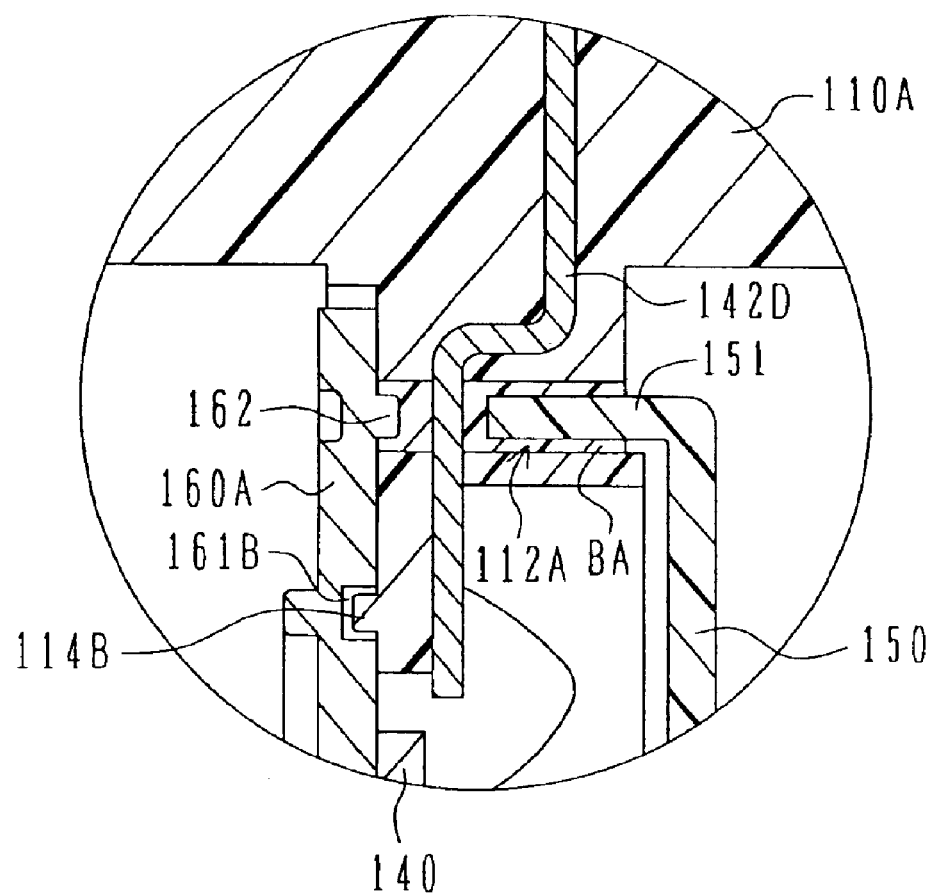
FIG. 17 is a sectional view showing a construction of a third example of the principal part of the air flowmeter as the device for detecting the physical quantity according to the first embodiment of the present invention, the view being an enlarged sectional view corresponding to the area Y1 in FIG. 2.

FIG. 17 is a sectional view showing a construction of a third example of the principal part of the air flowmeter as the device for detecting the physical quantity according to the first embodiment of the present invention, the view being an enlarged sectional view corresponding to the area Y1 in FIG. 2. Note that the same characters as those in FIGS. 1 to 3 and 14 denote the same components.

A groove 112A is formed in a housing 110A. The groove 112A is in the form of a through hole penetrating the housing 110A. In the state in which the cover 150 is not attached to the housing 110A, the conductive connector terminal 142D is entirely exposed in the flat form in an area corresponding to the groove 112A. The edge portion 151 at the outer periphery of the cover 150 is inserted in the rectangular ring-shaped groove 112A of the housing 110A, and the cover 150 is fixed to the housing 110A by an adhesive BA. The part of the conductive terminal 142D exposed in the groove 112A is covered with the adhesive BA when the cover 150 is attached in place.

A projection 114B provided on the housing 110A is pressed into a recess 161B formed in a base 160A, whereby the base 160A is properly positioned. Thereafter, the base 160A is fixedly mounted in place using an adhesive. A manner of realizing the combined structure is not always limited to pressing, but may be, for example, fitting. Further, the base 160A has a projection 162 and is properly positioned with the projection 162 pressed into the groove 112A. A manner of realizing the combined structure is not always limited to pressing, but may be, for example, fitting.

Next, a detailed structure of a second example of the area Y2 in FIG. 2 will be described with reference to FIG. 18.

Figure 18:
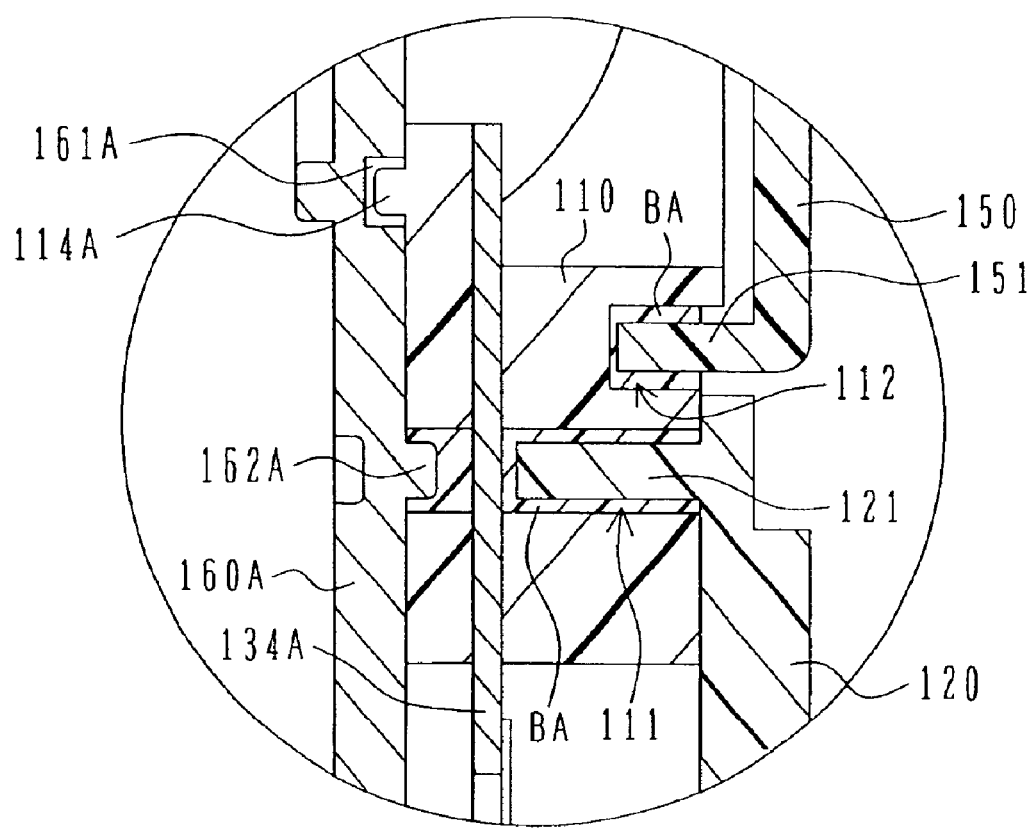
FIG. 18 is a sectional view showing a construction of a second example of the principal part of the air flowmeter as the device for detecting the physical quantity according to the first embodiment of the present invention, the view being an enlarged sectional view corresponding to the area Y2 in FIG. 2.

FIG. 18 is a sectional view showing a construction of a second example of the principal part of the air flowmeter as the device for detecting the physical quantity according to the first embodiment of the present invention, the view being an enlarged sectional view corresponding to the area Y2 in FIG. 2. Note that the same characters as those in FIGS. 1, 2 and 6 denote the same components.

The groove 111 is formed in the housing 110 so as to penetrate it. In the state in which the auxiliary passage body 120 is not attached to the housing 110, the conductive support member 134A is entirely exposed in the flat form in the area corresponding to the groove 111. The projection 121 at the outer periphery of the auxiliary passage body 120 is inserted in the groove 112 of the housing 110, and the auxiliary passage body 120 is fixed to the housing 110 by an adhesive BA. The part of the conductive member 134A exposed in the groove 111 is covered with the adhesive BA when the auxiliary passage body 120 is mounted to the housing 110.

A projection 114A provided on the housing 110 is pressed into a recess 161A formed in a base 160A, whereby the base 160A is properly positioned. Thereafter, the base 160A is fixedly mounted in place using an adhesive. A manner of realizing the combined structure is not always limited to pressing, but may be, for example, fitting. Further, the base 160A has a projection 162A and is properly positioned with the projection 162A pressed into the groove 111. A manner of realizing the combined structure is not always limited to pressing, but may be, for example, fitting.

The adhesive BA explained in this embodiment is an adhesive having a thixotropy ratio greater than 1. In an assembly process, after applying the adhesive BA to the projection 162A, the base 160A is assembled to the housing 110. Then, the adhesive BA is poured into the groove 111, and the auxiliary passage body 120 is mounted to the groove 111. Such an assembly process provides a structure that the conductive support members can easily be covered with the adhesive BA and air is prevented from stagnating in the adhesive BA.

Next, a detailed structure of a third example of the area Y2 in FIG. 2 will be described with reference to FIGS. 19 and 20.

Figure 19:
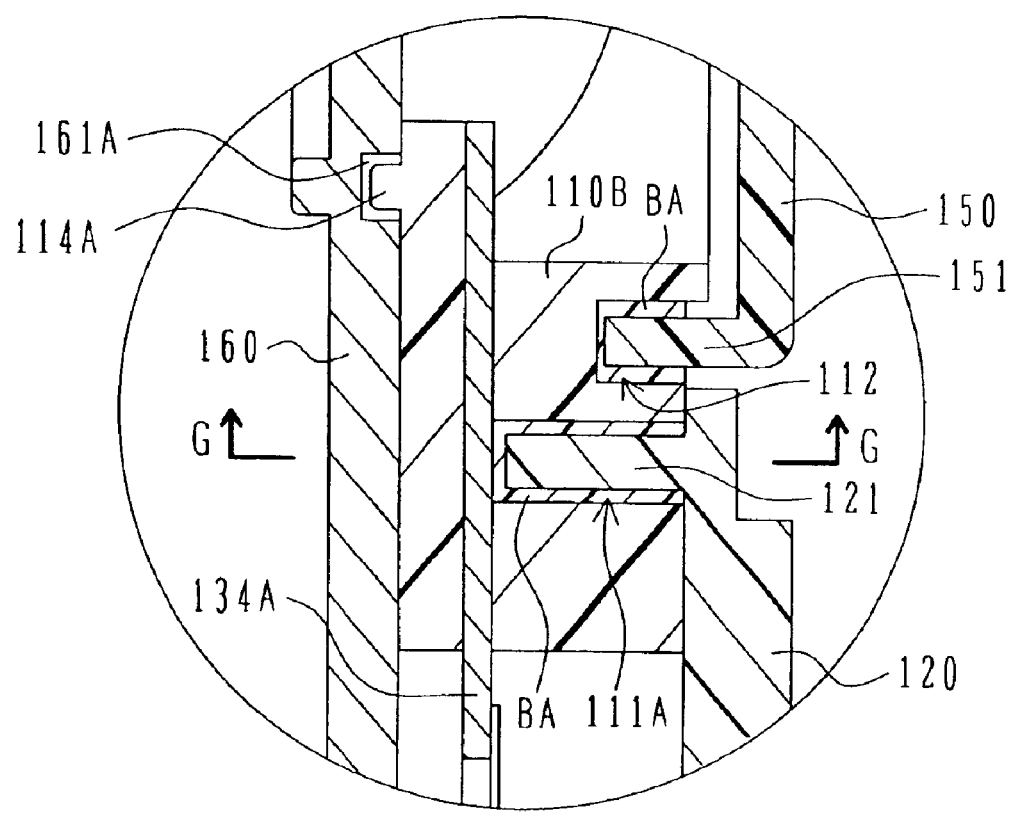
FIG. 19 is a sectional view showing a construction of a third example of the principal part of the air flowmeter as the device for detecting the physical quantity according to the first embodiment of the present invention, the view being an enlarged sectional view corresponding to the area Y2 in FIG. 2.

FIG. 19 is a sectional view showing a construction of a third example of the principal part of the air flowmeter as the device for detecting the physical quantity according to the first embodiment of the present invention, the view being an enlarged sectional view corresponding to the area Y2 in FIG. 2. FIG. 20 is a sectional view showing a construction of the third example of the principal part of the air flowmeter as the device for detecting the physical quantity according to the first embodiment of the present invention, the view being a sectional view taken along the line G—G in FIG. 19. Note that the same characters as those in FIGS. 1, 2 and 6 denote the same components.

A groove 111A is formed in a housing 110B. Unlike the groove 111, shown in FIG. 4, penetrating through the housing, the groove 111A is a bottom-equipped hole not penetrating through the housing. In the state in which the auxiliary passage body 120 is not attached to the housing 110B, the conductive support member 134A is partly exposed in the flat form in the area corresponding to the groove 111A. The projection 121 at the outer periphery of the auxiliary passage body 120 is inserted in the groove 111A of the housing 110B, and the auxiliary passage body 120 is fixed to the housing 110B by an adhesive BA. The part of the conductive member 134A exposed in the groove 111A is covered with the adhesive BA when the auxiliary passage body 120 is mounted to the housing 110B.

The projection 114A provided on the housing 110B is pressed into the recess 161A formed in the base 160A, whereby the base 160A is properly positioned. Thereafter, the base 160A is fixedly mounted in place using an adhesive. A manner of realizing the combined structure is not always limited to pressing, but may be, for example, fitting.

Another example of the detailed structure of the area Y2 in FIG. 2 will now be described with reference to FIG. 21.

Figure 20:
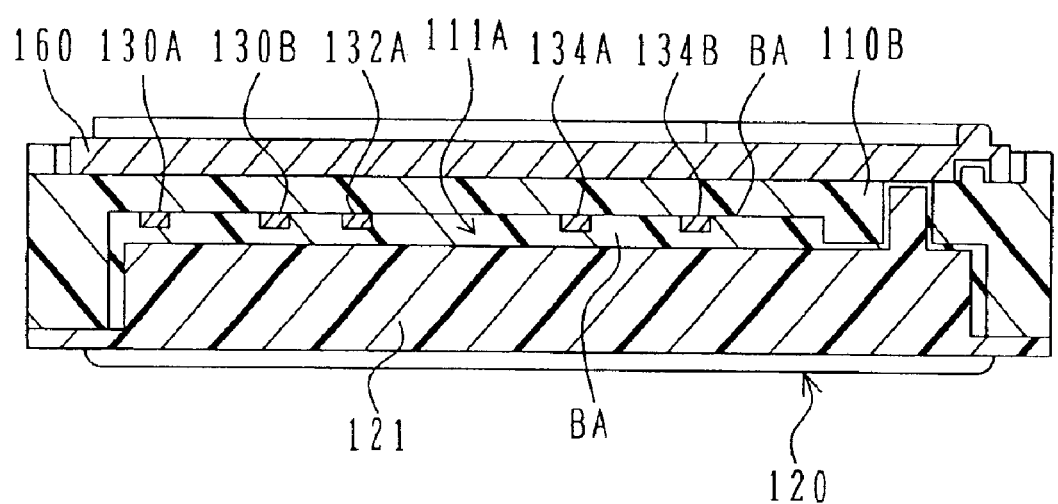
FIG. 20 is a sectional view showing a construction of a third example of a principal part of the air flowmeter as the device for detecting the physical quantity according to the first embodiment of the present invention, the view being a sectional view taken along the line G—G in FIG. 19.
Figure 21:
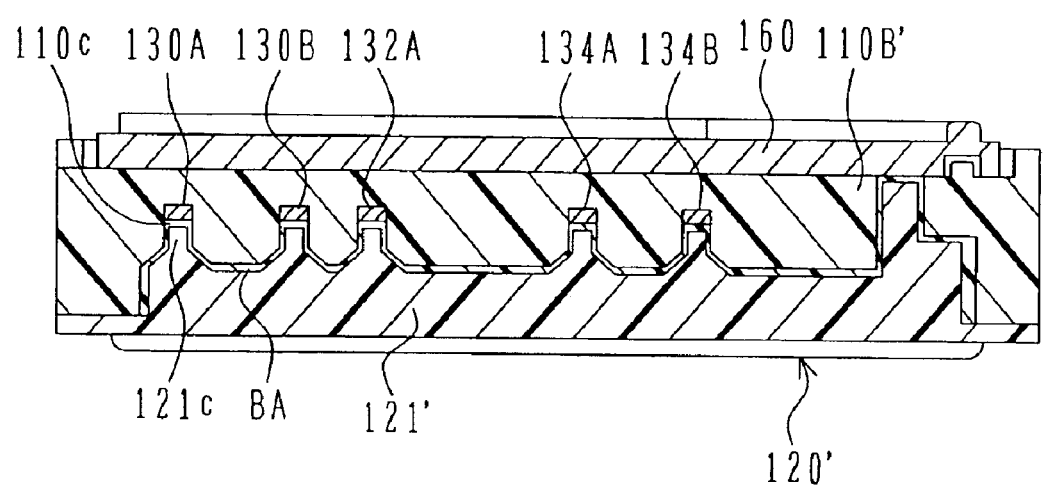
FIG. 21 is a sectional view showing another construction of the principal part of the air flowmeter as the device for detecting the physical quantity according to the first embodiment of the present invention, the view being a sectional view taken along the line G—G in FIG. 19 similarly to FIG. 20.

FIG. 21 is a sectional view showing another construction of the principal part of the air flowmeter as the device for detecting the physical quantity according to the first embodiment of the present invention, the view being a sectional view taken along the line G—G in FIG. 19 similarly to FIG. 20. Note that the same characters as those in FIGS. 1 and 2 denote the same components.

As is apparent from comparison with FIG. 20, the conductive support member 134A is disposed to locate in a recess 110c formed in a housing 110B'. On the other hand, a projection 121c is provided at a fore end of an edge portion 121' of an auxiliary passage body 120' in a position corresponding to the recess 110c. When attaching the auxiliary passage body 120' to the housing 110B', the projection 121c is pressed into the recess 110c.

Next, a detailed structure of a fourth example of the area Y2 in FIG. 2 will be described with reference to FIG. 22.

Figure 22:
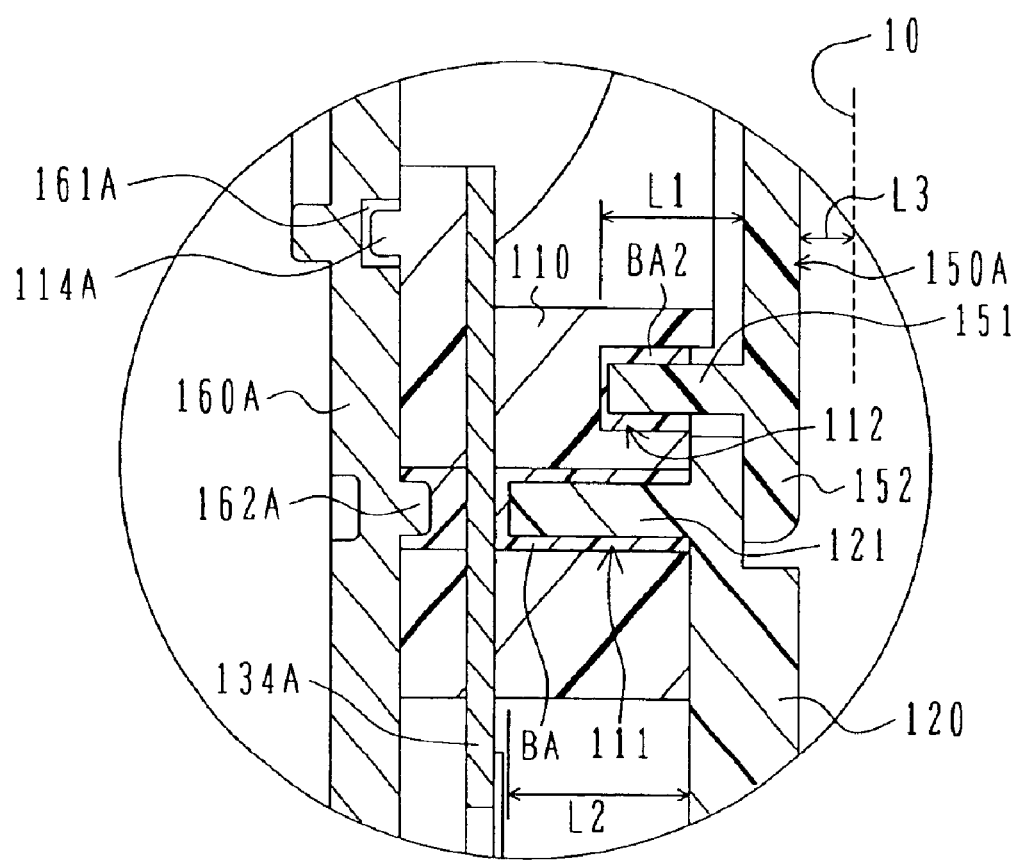
FIG. 22 is a sectional view showing a construction of a fourth example of the principal part of the air flowmeter as the device for detecting the physical quantity according to the first embodiment of the present invention, the view being an enlarged sectional view corresponding to the area Y2 in FIG. 2.

FIG. 22 is a sectional view showing a construction of a fourth example of the principal part of the air flowmeter as the device for detecting the physical quantity according to the first embodiment of the present invention, the view being an enlarged sectional view corresponding to the area Y2 in FIG. 2. Note that the same characters as those in FIGS. 1, 2, 6 and 12 denote the same components.

The groove 111 is formed in the housing 110 so as to penetrate it. In the state in which the auxiliary passage body 120 is not attached to the housing 110, the conductive support member 134A is entirely exposed in the flat form in the area corresponding to the groove 111. The projection 121 at the outer periphery of the auxiliary passage body 120 is inserted in the groove 111 of the housing 110, and the auxiliary passage body 120 is fixed to the housing 110 by an adhesive BA. The part of the conductive member 134A exposed in the groove 111 is covered with the adhesive BA when the auxiliary passage body 120 is mounted to the housing 110.

The projection 114A provided on the housing 110 is pressed into the recess 161A formed in the base 160A, whereby the base 160A is properly positioned. Thereafter, the base 160A is fixedly mounted in place using an adhesive. A manner of realizing the combined structure is not always limited to pressing, but may be, for example, fitting. Further, the base 160A has a projection 162A and is properly positioned with the projection 162A pressed into the groove 111. A manner of realizing the combined structure is not always limited to pressing, but may be, for example, fitting.

A cover 150A is fixedly attached to one surface of the housing 110. The cover 150A has an edge portion 151 bent along its outer periphery. The edge portion 151 is inserted in the rectangular ring-shaped groove 112 of the housing 110, and the cover 150A is fixed to the housing 110 by an adhesive. Further, a flange 152 is provided on the outer peripheral side of the edge portion 151. The flange 152 is disposed in an overlapped relation to a peripheral portion of the auxiliary passage body 120. Thus, because the auxiliary passage body 120 is retained in place by the flange 152, the auxiliary passage can be prevented from slipping off.

Assuming that the edge portion 151 has a length of L1, the projection 121 has a length of L2, and the distance between the cover 150A and the body 10 is L3, these parameters are set so as to satisfy L1>L3 and L1<L2 in this embodiment. This layout can contribute to preventing the slipping-off of the auxiliary passage.

Next, a detailed structure of a fifth example of the area Y2 in FIG. 2 will be described with reference to FIG. 23.

Figure 23:
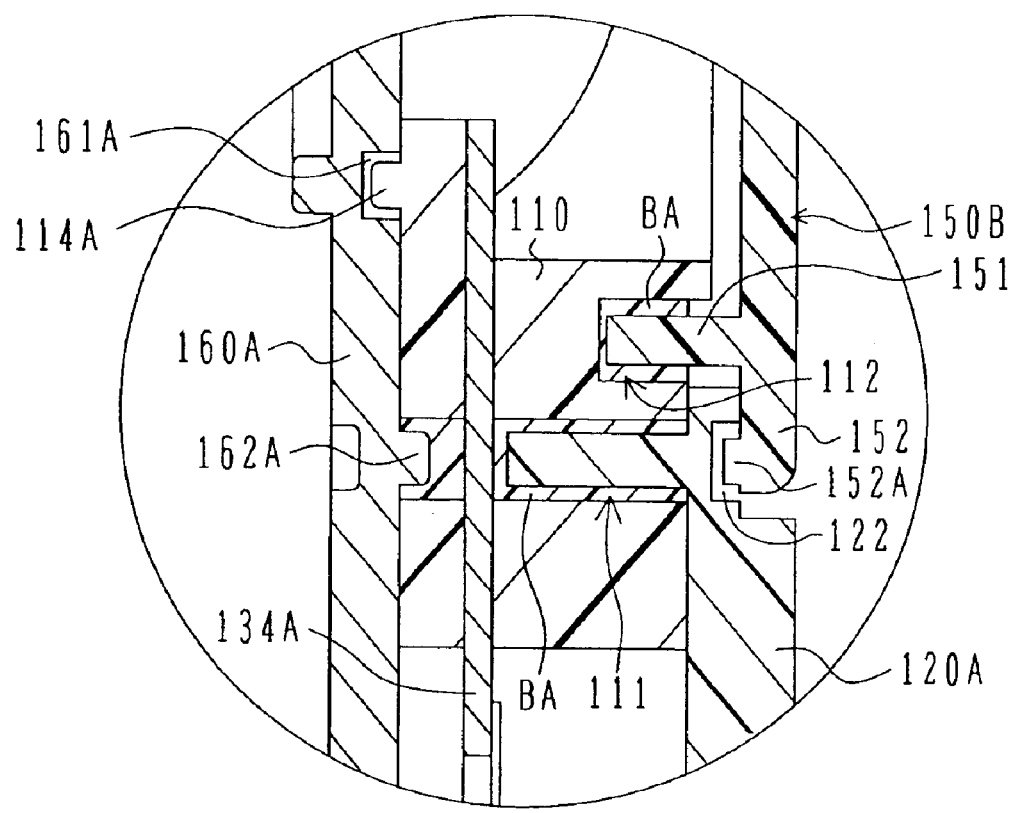
FIG. 23 is a sectional view showing a construction of a fifth example of the principal part of the air flowmeter as the device for detecting the physical quantity according to the first embodiment of the present invention, the view being an enlarged sectional view corresponding to the area Y2 in FIG. 2.

FIG. 23 is a sectional view showing a construction of a fifth example of the principal part of the air flowmeter as the device for detecting the physical quantity according to the first embodiment of the present invention, the view being an enlarged sectional view corresponding to the area Y2 in FIG. 2. Note that the same characters as those in FIGS. 1, 2, 6, 18 and 22 denote the same components.

The groove 111 is formed in the housing 110 so as to penetrate it. In the state in which an auxiliary passage body 120A is not attached to the housing 110, the conductive support member 134A is entirely exposed in the flat form in the area corresponding to the groove 111. A projection 121 at an outer periphery of the auxiliary passage body 120A is inserted in the groove 111 of the housing 110, and the auxiliary passage body 120A is fixed to the housing 110 by an adhesive BA. The part of the conductive member 134A exposed in the groove 111 is covered with the adhesive BA when the auxiliary passage body 120A is mounted to the housing 110.

The projection 114A provided on the housing 110 is pressed into the recess 161A formed in the base 160A, whereby the base 160A is properly positioned. Thereafter, the base 160A is fixedly mounted in place using an adhesive. A manner of realizing the combined structure is not always limited to pressing, but may be, for example, fitting. Further, the base 160A has a projection 162A and is properly positioned with the projection 162A pressed into the groove 111. A manner of realizing the combined structure is not always limited to pressing, but may be, for example, fitting.

A cover 150B is fixedly attached to one surface of the housing 110. The cover 150B has an edge portion 151 bent along its outer periphery. The edge portion 151 is inserted in the rectangular ring-shaped groove 112 of the housing 110, and the cover 150B is fixed to the housing 110 by an adhesive BA. Further, a flange 152 is provided on the outer peripheral side of the edge portion 151. The flange 152 is disposed in an overlapped relation to a peripheral portion of the auxiliary passage body 120A. The flange 152 has a projection 152A, and the projection 152A is fixed to a recess 122 formed in the auxiliary passage body 120A by an adhesive BA2. Thus, because the auxiliary passage body 120 is retained in place by the flange 152, the auxiliary passage can be prevented from slipping off. Further, the adhesives BA and BA2 used herein are different kinds of adhesives. Accordingly, even if one adhesive fails to develop a bonding ability, the other adhesive still retains a bonding ability so as to prevent the slipping-off of the auxiliary passage. In addition, by combining this structure with the auxiliary passage slipping-off preventing mechanism described above in connection with the example of FIG. 22, a dual auxiliary passage slipping-off preventing mechanism can be realized.

Next, a detailed structure of a sixth example of the area Y2 in FIG. 2 will be described with reference to FIG. 24.

Figure 24:
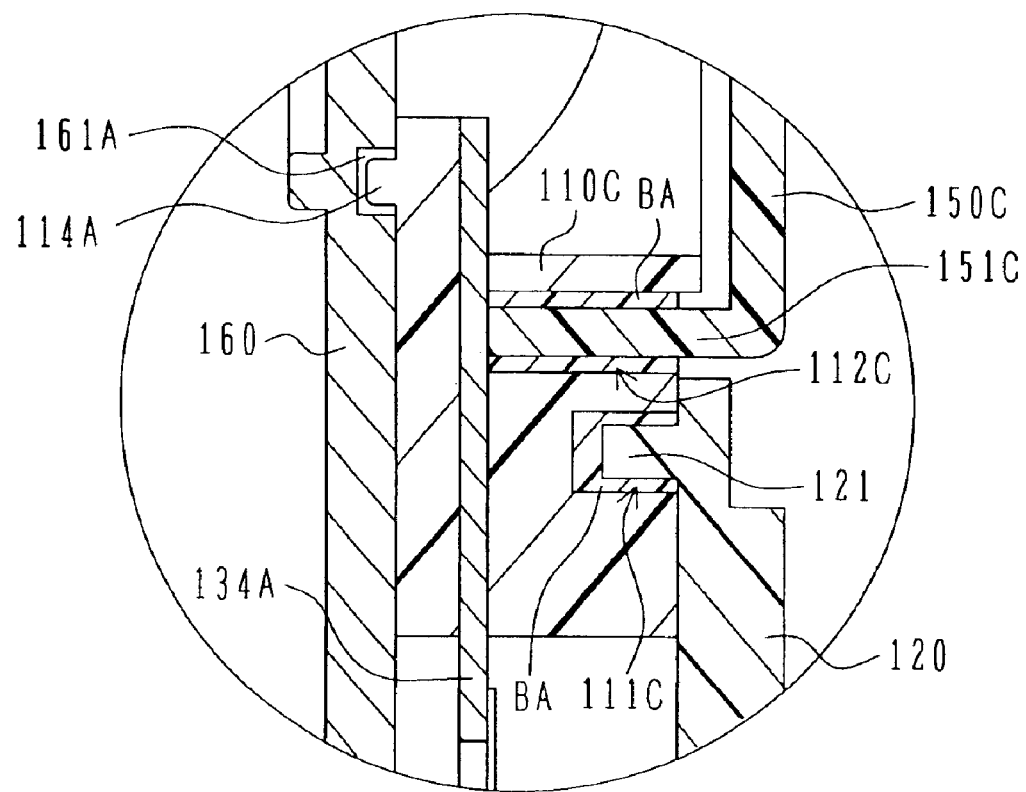
FIG. 24 is a sectional view showing a construction of a sixth example of the principal part of the air flowmeter as the device for detecting the physical quantity according to the first embodiment of the present invention, the view being an enlarged sectional view corresponding to the area Y2 in FIG. 2.

FIG. 24 is a sectional view showing a construction of a sixth example of the principal part of the air flowmeter as the device for detecting the physical quantity according to the first embodiment of the present invention, the view being an enlarged sectional view corresponding to the area Y2 in FIG. 2. Note that the same characters as those in FIGS. 1, 2, 6 and 19 denote the same components.

A groove 111C is formed in a housing 110C. The groove 111C is formed as a hole not reaching the support member 134A. On the other hand, a groove 112C is formed as a hole reaching the support member 134A. In the state in which a cover 150C is not attached to the housing 110C, therefore, the conductive support member 134A is partly exposed in the flat form in the area corresponding to the groove 112C.

The projection 121 at the outer periphery of the auxiliary passage body 120 is inserted in the groove 112C of the housing 110C, and the auxiliary passage body 120 is fixed to the housing 110C by an adhesive BA.

The cover 150C is fixedly attached to the housing 110C. The cover 150C has an edge portion 151C bent along its outer periphery. The edge portion 151C is inserted in the rectangular ring-shaped groove 112C of the housing 110, and the cover 150C is fixed to the housing 110C by an adhesive. The part of the conductive member 134A exposed in the groove 112C is covered with the adhesive BA when the cover 150C is attached in place.

With this embodiment, as described above, when the device characteristics are adjusted, the characteristic adjustment can be performed by connecting the probes to the corresponding exposed parts of the connector terminals. As a result, the adjustment works can easily be performed and the manufacturing process can be simplified.

Also, since the conductive support members exposed in the groove are covered with the adhesive when the auxiliary passage body is mounted in place, it is possible to prevent gas and liquids from entering and flowing out through the small gaps between the support members and the resin, and hence to improve the reliability.

Further, resistance values of the resistance members, such as the intake-air temperature sensor, the temperature sensitive resistor, and the resistance heater, can be measured with high accuracy by utilizing the parts of the support members exposed in the groove formed in the housing.

A construction of a device for detecting a physical quantity according to a second embodiment of the present invention will be described below with reference to FIGS. 25 and 26. Note that the following description is made of the device for detecting the physical quantity, taking as an example an air flowmeter with a resistance heater.

Figure 25:
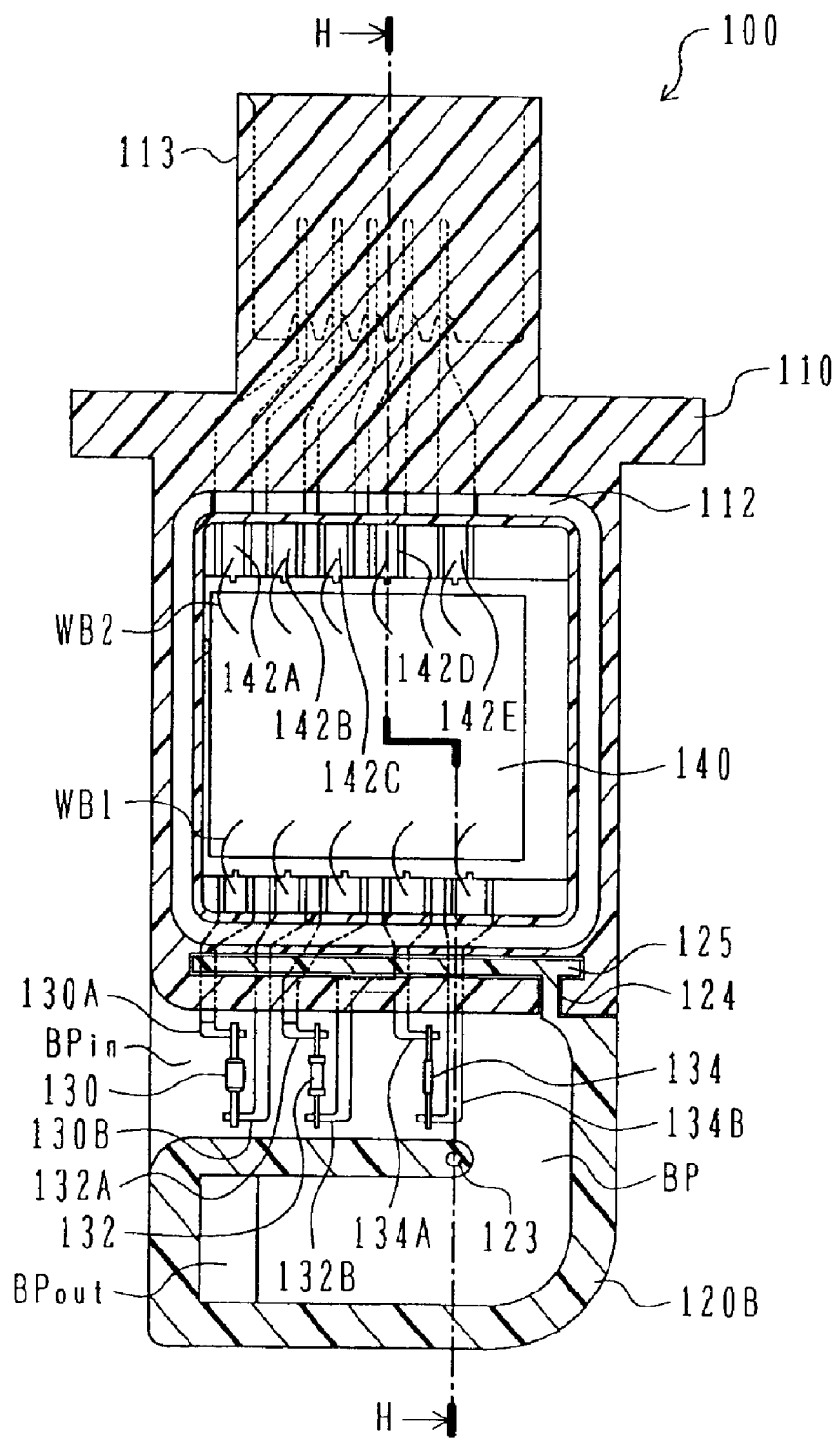
FIG. 25 is a cross-sectional view showing an overall construction of an air flowmeter as a device for detecting a physical quantity according to a second embodiment of the present invention.
Figure 26:
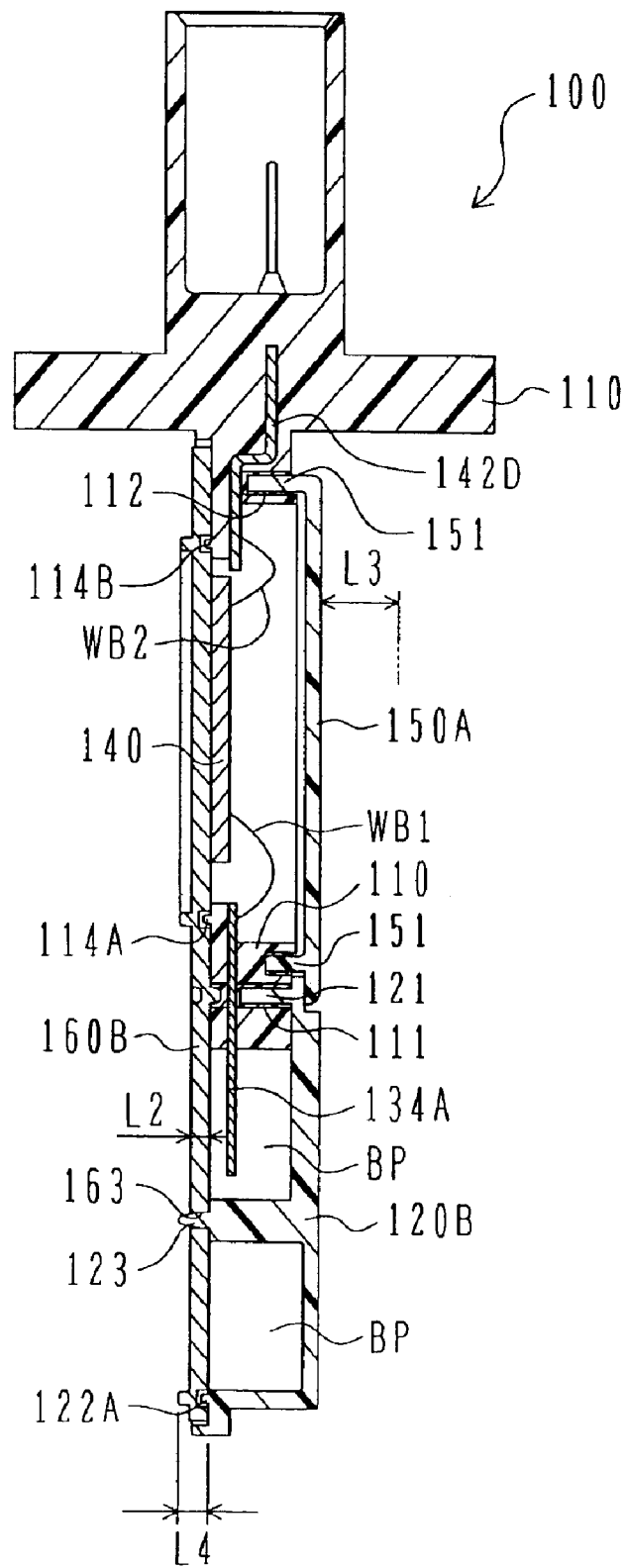
FIG. 26 is an enlarged sectional view taken along the line H—H in FIG. 25.

FIG. 25 is a cross-sectional view showing an overall construction of an air flowmeter as a device for detecting a physical quantity according to a second embodiment of the present invention, and FIG. 26 is an enlarged sectional view taken along the line H—H in FIG. 25. Note that, in FIGS. 1 and 2, the same characters denote the same components.

In this embodiment, a projection 123 is provided in a portion of an auxiliary passage body 120B at which a base 160B is mounted to the auxiliary passage body 120B. On the other hand, the base 160B has a hole 163 formed in a position corresponding to the projection 123. When mounting the base 160B to the auxiliary passage body 120B, the projection 123 is inserted in the hole 163 for positioning and then fixed in place by pressing. Thus, the projection 123 serves also as a positioning pin.

The auxiliary passage body 120B is also mounted to the housing 110 with the aid of a projection 124 and a projection 125. The projection 124 is formed as a projection extending perpendicularly to the airflow. The projection 125 is formed as a projection extending parallel to the airflow. By employing the projection 124 extending perpendicularly to the airflow and fitting the projection 124 to the housing 110, resistance against the airflow is increased, thus resulting in a structure that air present in a bypass is less apt to leak through the gap between the auxiliary passage body 120B and the housing 110. Further, the auxiliary passage body 120B is avoided from rotating relative to the housing 110 with the provision of the projection 125 extending parallel to the airflow and the projection 123 serving also as a positioning pin.

This embodiment can also provide the advantages given below. When the device characteristics are adjusted, the characteristic adjustment can be performed by connecting the probes to the corresponding exposed parts of the connector terminals. As a result, the adjustment works can easily be performed and the manufacturing process can be simplified.

Also, since the conductive support members exposed in the groove are covered with the adhesive when the auxiliary passage body is mounted in place, it is possible to prevent gas and liquids from entering and flowing out through the small gaps between the support members and the resin, and hence to improve the reliability.

Further, resistance values of the resistance members, such as the intake-air temperature sensor, the temperature sensitive resistor, and the resistance heater, can be measured with high accuracy by utilizing the parts of the support members exposed in the groove formed in the housing.

In addition, assuming that the projection 123 has a length of L4, the distance between the cover 150A and the body 10 is L3, and the base 160B has a thickness of L5, these parameters are set so as to satisfy L4>L3, L5>L3 and L4<L5. By combining this embodiment satisfying those conditions with the auxiliary passage slipping-off preventing mechanism described above in connection with FIG. 22, the slipping-off of the auxiliary passage can be prevented with higher reliability than only the auxiliary passage slipping-off preventing mechanism described above in connection with FIG. 22, because the upper side of the auxiliary passage body 120B is retained by the slipping-off preventing mechanism described above in connection with FIG. 22 and a central portion of the auxiliary air passage is retained by the projection 123 provided at the center of the auxiliary passage body 120B. Moreover, by combining the auxiliary passage slipping-off preventing mechanism described above in connection with the examples of FIGS. 22 and 23, the slipping-off of the auxiliary passage can be realized with even higher reliability.

A construction of a device for detecting a physical quantity according to a third embodiment of the present invention will be described below with reference to FIG. 27. Note that the following description is made of the device for detecting the physical quantity, taking as an example an air flowmeter with a resistance heater.

Figure 27:
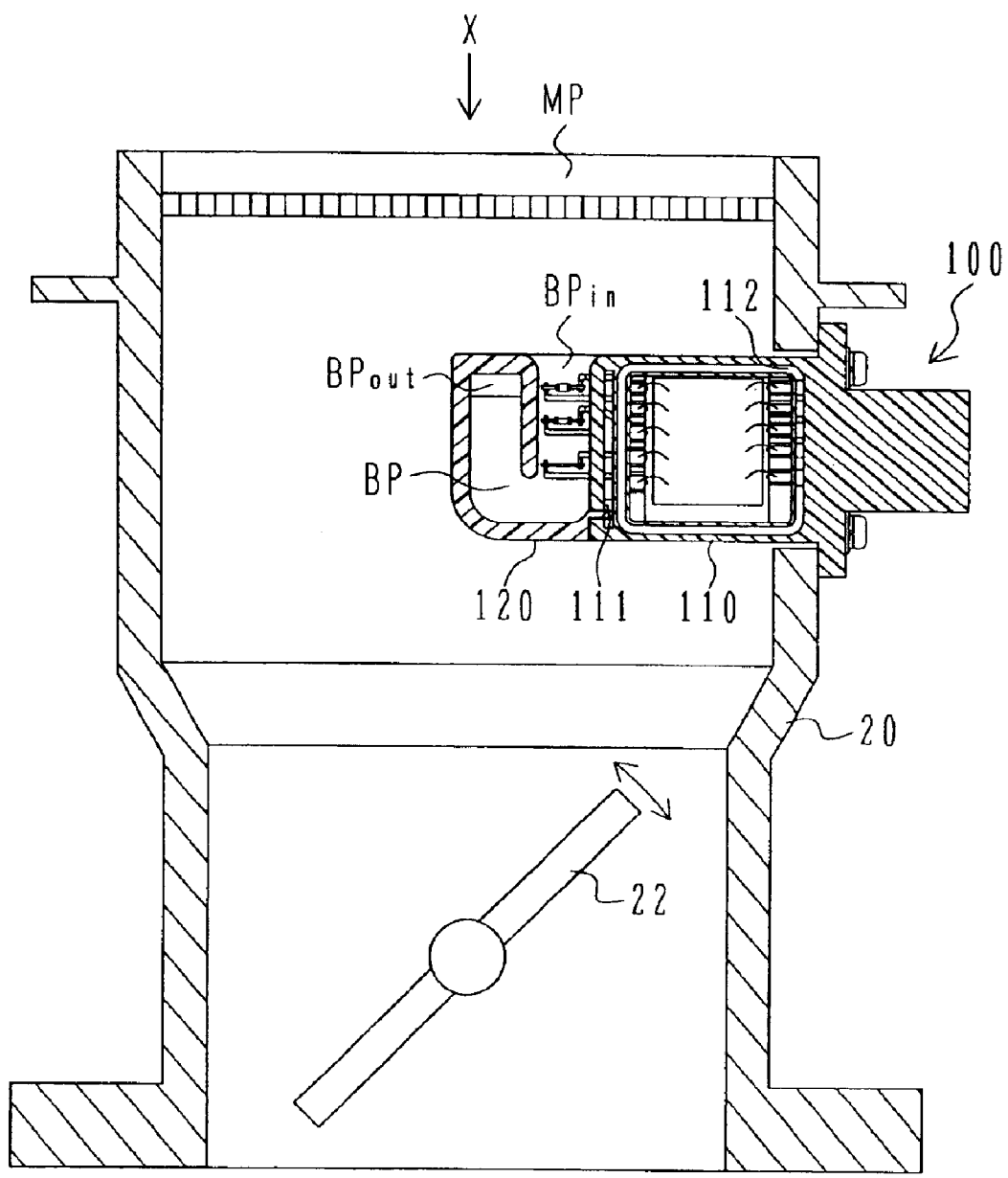
FIG. 27 is a cross-sectional view showing an overall construction of an air flowmeter as a device for detecting a physical quantity according to a third embodiment of the present invention.

FIG. 27 is a cross-sectional view showing an overall construction of an air flowmeter as a device for detecting a physical quantity according to a third embodiment of the present invention.

A throttle valve 22 is disposed in a body 20 such that the throttle valve 22 is rotatable. An air flowmeter 100 is mounted to the body 20 at a position upstream of the throttle valve 22. A main air passage MP is formed in the body 20, and intake air for an internal combustion engine is introduced, for example; in the direction of an arrow X. A fore end of the air flowmeter 100 is inserted to project into the main air passage MP.

A construction of the air flowmeter 100 is similar to that shown in FIG. 1 or 2. A part of the intake air flowing through the main air passage MP flows into an auxiliary air passage BP from an inlet port BPin and flows out of it from an outlet port BPout. The flow rate and temperature of the air flowing through the auxiliary air passage BP are measured by an intake-air temperature sensor, a resistance heater, a temperature sensitive resistor, etc., which are disposed in the auxiliary air passage BP.

In this embodiment, as with the above embodiments, conductive support members for supporting both ends of the intake-air temperature sensor, the temperature sensitive resistor, and the resistance heater are exposed in the flat form in areas corresponding to a groove 111 of a housing 110. The parts of the conductive members exposed in the groove 111 are covered with an adhesive when an auxiliary passage body 120 is mounted in place.

Further, parts of conductive connector terminals are exposed in the flat form in areas corresponding to a groove 112 formed in the housing 110. The parts of the conductive members exposed in the groove 112 are covered with an adhesive when a cover is attached in place.

With the construction described above, when the air flowmeter is mounted to the body and the flowmeter characteristics are adjusted, the characteristic adjustment can similarly be performed by connecting the probes to the corresponding exposed parts of the connector terminals. As a result, the adjustment works can easily be performed and the manufacturing process can be simplified.

Also, since the conductive support members exposed in the groove are covered with the adhesive when the auxiliary passage body is mounted in place, it is possible to prevent gas and liquids from entering and flowing out through the small gaps between the support members and the resin, and hence to improve the reliability.

Further, resistance values of the resistance members, such as the intake-air temperature sensor, the temperature sensitive resistor, and the resistance heater, can be measured with high accuracy by utilizing the parts of the support members exposed in the groove formed in the housing.

A construction of a device for detecting a physical quantity according to a fourth embodiment of the present invention will be described below with reference to FIG. 28. Note that the following description is made of the device for detecting the physical quantity, taking as an example an air flowmeter with a resistance heater.

Figure 28:
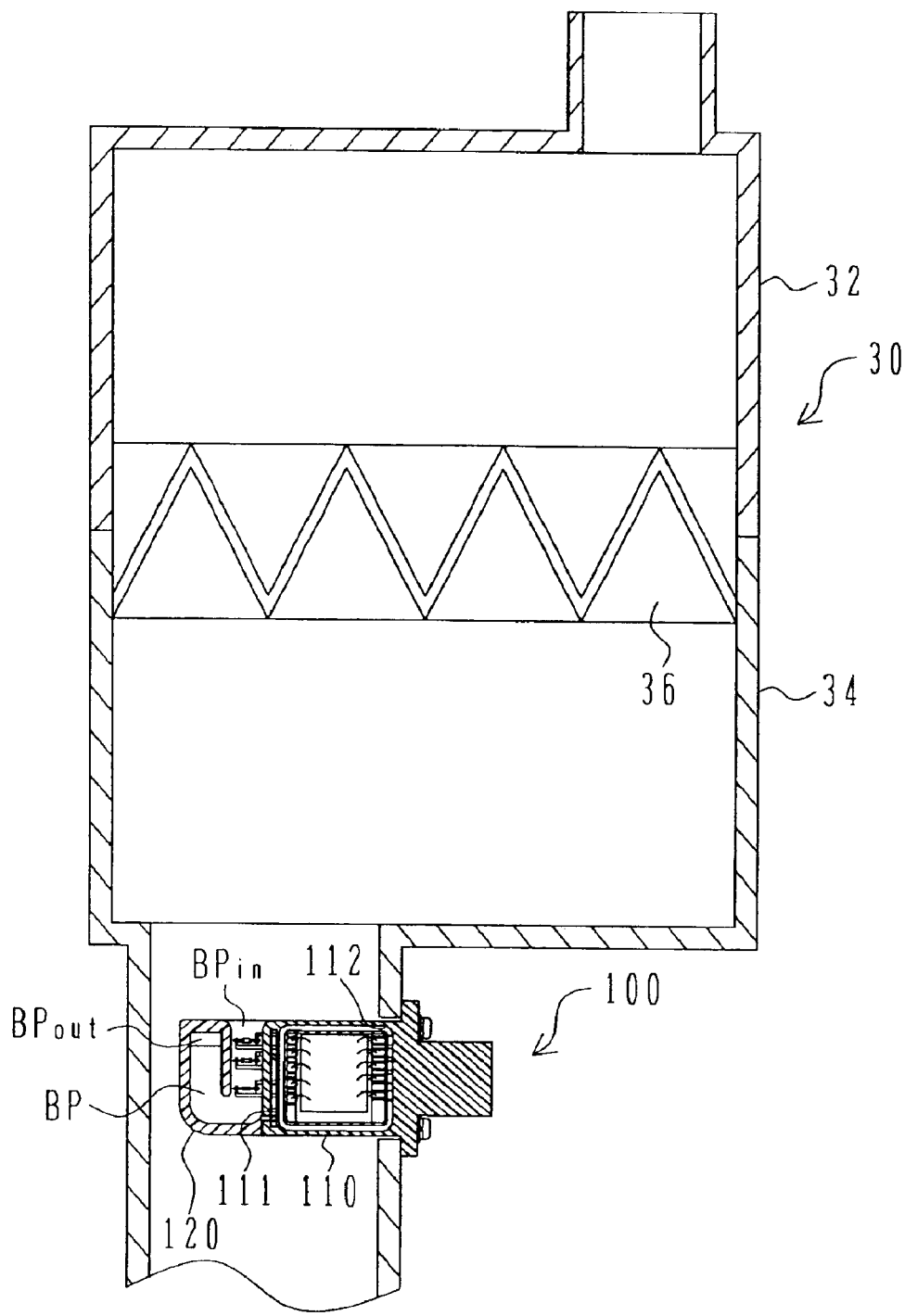
FIG. 28 is a cross-sectional view showing an overall construction of an air flowmeter as a device for detecting a physical quantity according to a fourth embodiment of the present invention.

FIG. 28 is a cross-sectional view showing an overall construction of an air flowmeter as a device for detecting a physical quantity according to a fourth embodiment of the present invention.

An air cleaner 30 comprises an upstream case member 32 having an introduction duct to take in a flow of intake air, a downstream case member 34 having a duct to introduce the intake air into an engine room, and a filter member 36 held by both the members 32, 34 and removing dust in the air. In the air cleaner 30, the air flowmeter 100 including the auxiliary air passage BP formed integrally therewith is mounted to the downstream case member 34.

A construction of the air flowmeter 100 is similar to that shown in FIG. 1 or 2. A part of the intake air introduced through the air cleaner 30 flows into an auxiliary air passage BP from an inlet port BPin and flows out of it from an outlet port BPout. The flow rate and temperature of the air flowing through the auxiliary air passage BP are measured by an intake-air temperature sensor, a resistance heater, a temperature sensitive resistor, etc., which are disposed in the auxiliary air passage BP.

In this embodiment, as with the above embodiments, conductive support members for supporting both ends of the intake-air temperature sensor, the temperature sensitive resistor, and the resistance heater are exposed in the flat form in areas corresponding to a groove 111 of a housing 110. The parts of the conductive members exposed in the groove 111 are covered with an adhesive when an auxiliary passage body 120 is mounted in place.

Further, parts of conductive connector terminals are exposed in the flat form in areas corresponding to a groove 112 formed in the housing 110. The parts of the conductive members exposed in the groove 112 are covered with an adhesive when a cover is attached in place.

With the construction described above, when the air flowmeter is mounted to the air cleaner and the flowmeter characteristics are adjusted, the characteristic adjustment can similarly be performed by connecting the probes to the corresponding exposed parts of the connector terminals. As a result, the adjustment works can easily be performed and the manufacturing process can be simplified.

Also, since the conductive support members exposed in the groove are covered with the adhesive when the auxiliary passage body is mounted in place, it is possible to prevent gas and liquids from entering and flowing out through the small gaps between the support members and the resin, and hence to improve the reliability.

Further, resistance values of the resistance members, such as the intake-air temperature sensor, the temperature sensitive resistor, and the resistance heater, can be measured with high accuracy by utilizing the parts of the support members exposed in the groove formed in the housing.

A construction of a device for detecting a physical quantity according to a firth embodiment of the present invention will be described below with reference to FIGS. 29 and 30. Note that the following description is made of the device for detecting the physical quantity, taking as an example a pressure measuring device.

Figure 29:
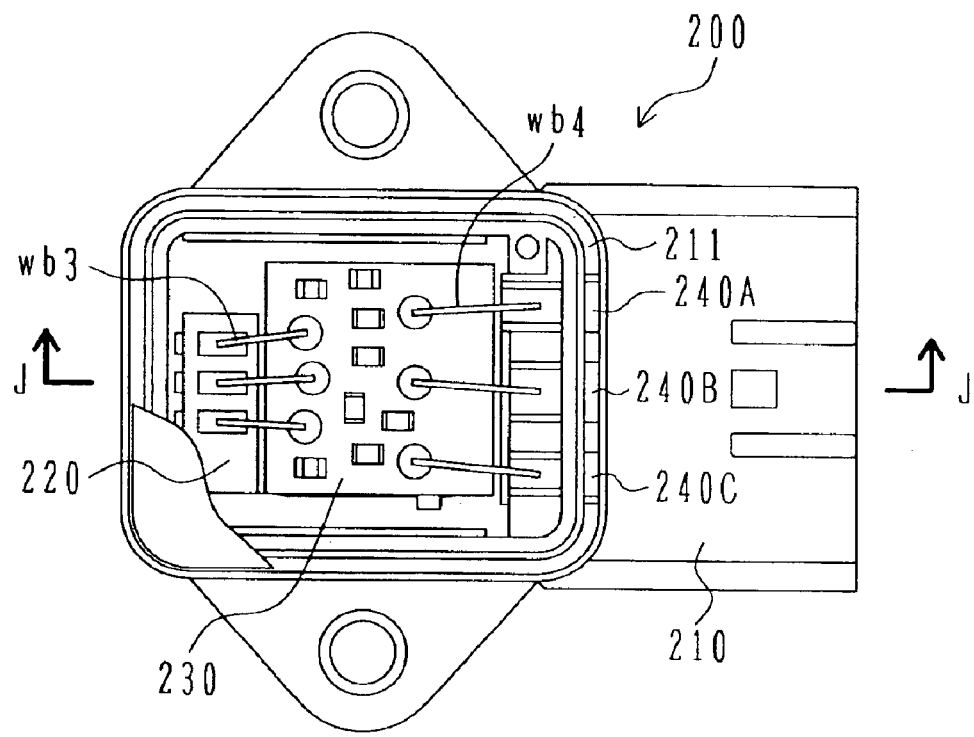
FIG. 29 is a plan view showing an overall construction of a pressure measuring device as a device for detecting a physical quantity according to a fourth embodiment of the present invention.
Figure 30:
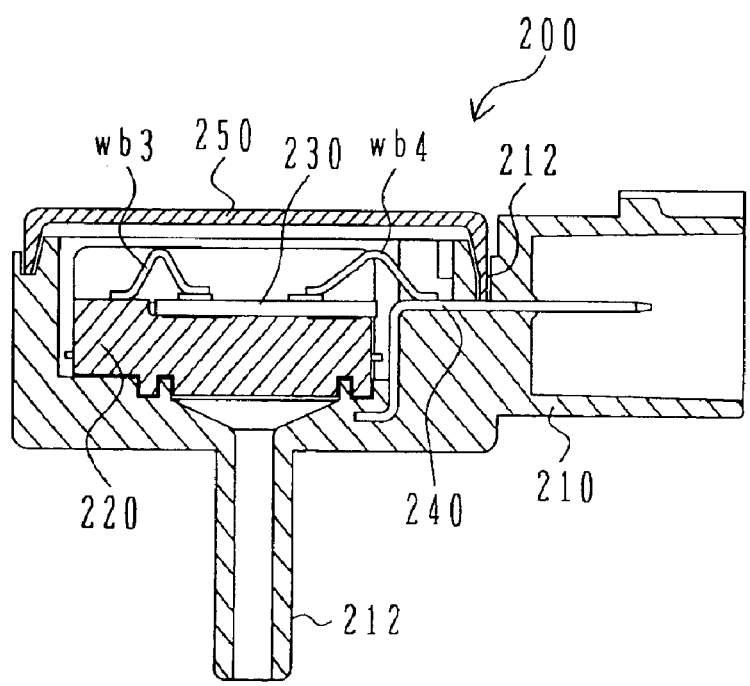
FIG. 30 is a longitudinal sectional view taken along the line J—J in FIG. 29.

FIG. 29 is a plan view showing an overall construction of a pressure measuring device as a device for detecting a physical quantity according to a fifth embodiment of the present invention, and FIG. 30 is a longitudinal sectional view taken along the line J—J in FIG. 29.

As shown in FIG. 29, a pressure measuring device 200 comprises a housing 210, a pressure measuring section 220, and an electronic circuit 230. The pressure measuring section 220 and the electronic circuit 230 are both contained in the housing 210. The pressure measuring section 220 comprises a semiconductor substrate, a resistor such as a semiconductor strain gauge, and a temperature sensitive resistor for compensating temperature, the latter two being formed on the semiconductor substrate. The pressure measuring section 220 is fixed to the housing 210 as shown in FIG. 30. A pressure introducing port 214 is provided at a bottom portion of the housing 210. A pressure of intake air for an internal combustion engine introduced through the pressure introducing port 214 is detected by the pressure measuring section 220.

A terminal of the pressure measuring section 220 is connected to the electronic circuit 230 by wire bonding indicated by wb3. The electronic circuit 230 includes therein a circuit for detecting a pressure, a sensitivity compensating circuit for compensating sensitivity, and an adjusting circuit for adjusting the 0-span. A plurality of connection terminals of the electronic circuit 230 are connected respectively to conductive connector terminals 40A, 240B and 240C by wire bonding indicated by wb4. The conductive connector terminals 240A, 240B and 240C are fixedly held in the housing 210 by insert molding.

A groove 212 is formed in the housing 210. In the state in which a cover 250 is not attached to the housing 210, the conductive connector terminals 240A, 240B and 240C are each partly exposed in the flat form in an area corresponding to the groove 212. The parts of the conductive members exposed in the groove 212 are covered with an adhesive when the cover 250 is attached in place.

With the construction described above, also in a pressure sensor as one example of the device for detecting the physical quantity, when the sensor characteristics are adjusted, the characteristic adjustment can be performed by connecting the probes to the corresponding exposed parts of the connector terminals. As a result, the adjustment works can easily be performed and the manufacturing process can be simplified.

Also, since the conductive members exposed in the groove are covered with the adhesive when the cover is attached in place, it is possible to prevent gas and liquids from entering and flowing out through the small gaps between the support members and the resin, and hence to improve the reliability.

Figure 31:
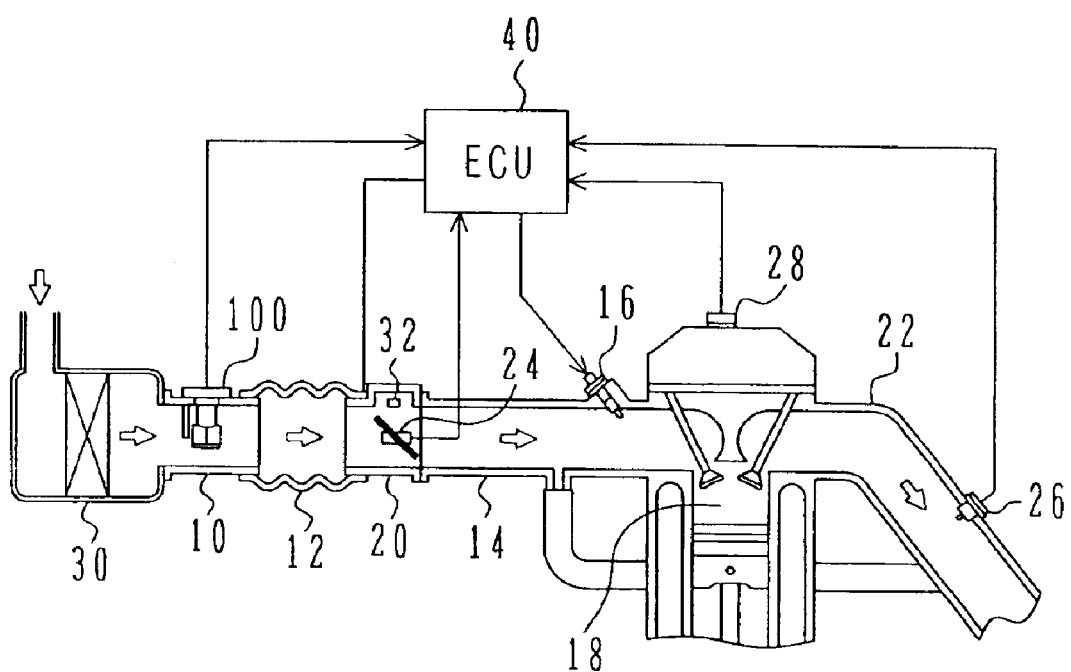
FIG. 31 is a system diagram showing a construction of an engine control system using the device for detecting the physical quantity according to each of the embodiments of the present invention.

Next, a description is made of a system construction of an engine control system using the device for detecting the physical quantity according to each of the embodiments of the present invention with reference to FIG. 31.

FIG. 31 is a system diagram showing a construction of an engine control system using the device for detecting the physical quantity according to each of the embodiments of the present invention.

Intake air sucked through an air cleaner 30 is introduced to an engine cylinder 18 through a body 10 of an air flowmeter 100 with a resistance heater, a suction duct 12, a throttle body 20, and a manifold 16 provided with an injector 14 to which fuel is supplied. On the other hand, gas generated in the engine cylinder 18 is exhausted through an exhaust manifold 22.

A control unit 40 calculates an optimum amount of injected fuel in accordance with an air flow rate signal outputted from an electronic circuit of the air flowmeter 100 with the resistance heater, a throttle valve angle signal outputted from a throttle angle sensor 24, an oxygen content signal outputted from an oxygen densitometer 26 provided in an intake manifold, and an engine revolution angle signal detected by an engine revolution speed sensor 28. Further, the control unit 40 injects fuel from the injector 14, and at the same time controls an idle air control valve 32.

While this example employs the air flowmeter 100, the engine may be controlled by using the pressure sensor 200 shown in FIG. 29.

INDUSTRIAL APPLICABILITY

According to the present invention, it is possible to easily perform works for adjusting a device for detecting a physical quantity and to simplify the manufacturing process.

What is claimed is:

1. A device for detecting a physical quantity, the device comprising:
    a detector for detecting a physical quantity;
    an electronic circuit electrically connected to said detector;
    a housing for accommodating and holding said electronic circuit therein; and
    a terminal for connecting said electronic circuit to an external device and a housing connector for surrounding one end portion of said terminal projected externally of said housing, an other end portion of said terminal being disposed in said housing,
    wherein a groove for making a part of said terminal exposed therein is formed in a part of a frame portion of said housing, and said terminal communicates said electronic circuit on the inside of said housing with said housing connecter.

2. A device for detecting a physical quantity according to claim 1, wherein said terminal for connecting said electronic circuit to said external device comprises output, ground and power source terminals.

3. A device for detecting a physical quantity, the device comprising:
- a detector for detecting a physical quantity;
- an electronic circuit electrically connected to said detector and outputting a signal corresponding to the physical quantity;
- a housing for accommodating and holding said electronic circuit therein; and
- a support member for supporting said detector externally of said housing, said support member being disposed in said housing,
- wherein a groove for making a part of said support member exposed therein is formed in a part of a frame portion of said housing, and said support member communicates said electronic circuit inside said housing and said detector outside said housing with each other.

4. A device for detecting a physical quantity according to claim 1,
wherein said terminal exposed in said groove has a plate-shaped cross-section.

5. A device for detecting a physical quantity according to claim 4,
wherein said terminal exposed in said groove has a cross-section exposed at both sides parallel to an open surface of said groove.

6. A device for detecting a physical quantity according to claim 1,
wherein after adjusting characteristics of said device for detecting the physical quantity by using said terminal exposed in said groove, said exposed terminal is covered with an adhesive.

7. A device for detecting a physical quantity according to claim 3,
wherein after adjusting reference characteristics of said detector by using said support member exposed in said groove, said exposed terminal is covered with an adhesive.

8. A device for detecting a physical quantity according to claim 6,
wherein a part of another member is inserted in said groove, and said another member is fixedly bonded to said housing by using an adhesive.

9. A device for detecting a physical quantity according to claim 8,
wherein said another member is a cover covering an open surface of said housing.

10. A device for detecting a physical quantity according to of claim 1, wherein said terminal end portion disposed in said housing is formed integrally with said housing, and said groove, in which said terminal is partly exposed, is formed in a part of said housing.

11. A device for detecting a physical quantity according to claim 3,
wherein said support member exposed in said groove has a plate-shaped cross-section.

12. A device for detecting a physical quantity according to claim 11,
wherein said support member exposed in said groove has a cross-section exposed at both sides parallel to an open surface of said groove.

13. A device for detecting a physical quantity according to claim 3,
wherein after adjusting characteristics of said device for detecting the physical quantity by using said support member exposed in said groove, said exposed support member is covered with an adhesive.

14. A device for detecting a physical quantity according to claim 3,
wherein after adjusting reference characteristics of said detector by using said support member exposed in said groove, said exposed support member is covered with an adhesive.

15. A device for detecting a physical quantity according to claim 14,
wherein a part of another member is inserted in said groove, and said another member is fixedly bonded to said housing by using an adhesive.

16. A device for detecting a physical quantity according to claim 8,
wherein said another member is an auxiliary passage body.

17. A device for detecting a physical quantity according to of claim 3,
wherein said support member disposed in said housing is formed integrally with said housing, and said groove, in which said support member is partly exposed, is formed in a part of said housing.

* * * * *